(12) United States Patent
Gu et al.

(10) Patent No.: US 11,975,726 B1
(45) Date of Patent: May 7, 2024

(54) SYSTEMS AND METHODS FOR INTERACTION-BASED TRAJECTORY PREDICTION

(71) Applicant: UATC, LLC, Mountain View, CA (US)

(72) Inventors: Yiming Gu, Pittsburgh, PA (US); Galen Clark Haynes, Pittsburgh, PA (US); Anh Tuan Hoang, Jersey City, NY (US); Sumit Kumar, Sunnyvale, CA (US); Micol Marchetti-Bowick, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 190 days.

(21) Appl. No.: 17/387,276

(22) Filed: Jul. 28, 2021

Related U.S. Application Data

(60) Provisional application No. 63/057,510, filed on Jul. 28, 2020.

(51) Int. Cl.
*G06N 3/04* (2023.01)
*B60W 50/00* (2006.01)

(52) U.S. Cl.
CPC ........... *B60W 50/0097* (2013.01); *G06N 3/04* (2013.01); *B60W 2050/0028* (2013.01);
(Continued)

(58) Field of Classification Search
CPC ..... B60W 50/0097; B60W 2050/0028; B60W 2554/4041; B60W 2554/4042;
(Continued)

(56) References Cited

U.S. PATENT DOCUMENTS

| 11,458,987 B2 * | 10/2022 | Li ...................... B60W 50/0097 |
| 2020/0114924 A1 * | 4/2020 | Chen ..................... B60W 40/09 |

(Continued)

OTHER PUBLICATIONS

Alahi et al., "Social LSTM: Human Trajectory Prediction in Crowded Spaces", IEEE Conference on Computer Vision and Pattern Recognition, Jun. 27-30, 2016, Las Vegas, Nevada, pp. 961-971.
(Continued)

*Primary Examiner* — Peter D Nolan
*Assistant Examiner* — Ashley L Redhead, Jr.
(74) *Attorney, Agent, or Firm* — Dority & Manning, P.A.

(57) ABSTRACT

Systems and methods for predicting interactions between objects and predicting a trajectory of an object are presented herein. A system can obtain object data associated with a first object and a second object. The object data can have position data and velocity data for the first object and the second object. Additionally, the system can process the obtained object data to generate a hybrid graph using a graph generator. The hybrid graph can have a first node indicative of the first object and a second node indicative of the second object. Moreover, the system can process, using an interaction prediction model, the generated hybrid graph to predict an interaction type between the first node and the second node. Furthermore, the system can process, using a graph neural network model, the predicted interaction type between the first node and the second node to predict a trajectory of the first object.

20 Claims, 8 Drawing Sheets

(52) U.S. Cl.
CPC .............. *B60W 2554/4041* (2020.02); *B60W 2554/4042* (2020.02); *B60W 2554/4043* (2020.02); *B60W 2554/801* (2020.02); *B60W 2554/802* (2020.02)

(58) Field of Classification Search
CPC ... B60W 2554/4043; B60W 2554/801; B60W 2554/802; G06N 3/04
See application file for complete search history.

(56) References Cited

U.S. PATENT DOCUMENTS

| | | | | |
|---|---|---|---|---|
| 2021/0192748 | A1* | 6/2021 | Morales Morales | ........................ G05D 1/0088 |
| 2021/0370990 | A1* | 12/2021 | Wulfe | .................. G05D 1/0088 |
| 2022/0274625 | A1* | 9/2022 | Garimella | ................ G06N 3/04 |
| 2022/0355825 | A1* | 11/2022 | Deo | ..................... G06N 3/0464 |

OTHER PUBLICATIONS

Bansal et al., :ChauffeurNet: Learning to Drive by Imitating the Best and Synthesizing the Worst, arXiv:1812.03079v1, Dec. 7, 2018, p. 10.
Barth et al., "Where Will the Oncoming Vehicle be the Next Second?" IEEE Intelligent Vehicles Symposium, Eindhoven, The Netherlands, Jun. 4-6, 2008, pp. 1068-1073.
Casas et al., "IntentNet: Learning to Predict Intention from Raw Sensor Data" Conference on Robot Learning, Zurich, Switzerland, Oct. 29-31, 2018, pp. 947-956.
Casas et al., "Spatially-Aware Graph Neural Networks for Relational Behavior Forecasting from Sensor Data", arXiv:1910.08233v1, Oct. 18, 2019, 11 pages.
Chou et al., "Predicting Motion of Vulnerable Road Users Using High-Definition Maps and Efficient ConvNets", arXiv:1906.08469v1, Jun. 20, 2019, 9 pages.
Deo et al., "Convolutional Social Pooling for Vehicle Trajectory Prediction", IEEE Conference on Computer Vision and Pattern Recognition Workshops, Jun. 18-22, 2018, Salt Lake City, Utah, pp. 1468-1476.
Djuric et al., "MultiNet: Multiclass Multistage Multimodal Motion Prediction", arXiv:2006.02000v1, Jun. 3, 2020, 8 pages.
Djuric et al., "Short-Term Motion Prediction of Traffic Actors for Autonomous Driving Using Deep Convolutional Networks", arXiv:1808.05819v2, Sep. 16, 2018, 7 pages.
Djuric et al., "Motion Prediction of Traffic Actors for Autonomous Driving Using Deep Convolutional Networks", arXiv:1808.05819v1, Aug. 17, 2018, 10 pages.
Gao et al., "VectorNet: Encoding HD Maps and Agent Dynamics from Vectorized Representation", IEEE Conference on Computer Vision and Pattern Recognition, Jun. 14-19, 2020, Virtual, pp. 11525-11533.
Gupta et al., "Social GAN: Socially Acceptable Trajectories with Generative Adversarial Networks", IEEE Conference on Computer Vision and Pattern Recognition, Jun. 18-22, 2018, Salt Lake City, Utah, pp. 2255-2264.
Helbing et al., "Social Force Model for Pedestrian Dynamics" Physical Review E, vol. 51, No. 5, May 1995, pp. 4282-4286.
Kaempchen et al., "IMM Object Tracking for High Dynamic Driving Maneuvers", IEEE Symposium on Intelligent Vehicle, June 14-17, Parma, Italy, 2004, pp. 825-830.
Kitani et al., "Activity Forecasting", 12th European Conference on Computer Vision, Oct. 7-13, 2012, Firenze, Italy, pp. 201-214.
Lee et al., "DESIRE: Distant Future Prediction in Dynamic Scenes with Interacting Agents", IEEE Conference on Computer Vision and Pattern Recognition, Jul. 21-26, Honolulu, Hawaii, pp. 336-345.
Lee et al., "Joint Interaction and Trajectory Prediction for Autonomous Driving using Graph Neural Networks", arXiv:1912.07882v1, Dec. 17, 2019, 9 pages.
Luo et al., Fast and Furious: Real Time End-to-End 3D Detection, Tracking and Motion Forecasting with a Single Convolutional Net. 2018 IEEE Conference on Computer Vision and Pattern Recognition, Jun. 18-23, 2018, Salt Lake City, Utah, pp. 3569-3577.
Rhinehart et al., "PRECOG: Prediction Conditioned on Goals in Visual Multi-Agent Settings". IEEE International Conference on Computer Vision, Oct. 27-Nov. 2, 2019, Seoul, Korea, pp. 2821-2830.
Rhinehart et al., "R2P2: A ReparameteRized Pushforward Policy for Diverse, Precise Generative Path Forecasting" European Conference on Computer Vision, Sep. 8-14, 2018, Munich, Germany, pp. 772-788.
Sadeghian et al. "SoPhie: An Attentive GAN for Predicting Paths Compliant to Social and Physical Constraints", IEEE Conference on Computer Vision and Pattern Recognition, Jun. 16-20, 2019, Long Beach, California, pp. 1349-1358.
Zhao et al., "Multi-Agent Tensor Fusion for Contextual Trajectory Prediction", IEEE Conference on Computer Vision and Pattern Recognition, Jun. 16-20, 2019, Long Beach, California, pp. 12126-12134.

* cited by examiner

SYSTEMS AND METHODS FOR INTERACTION-BASED TRAJECTORY PREDICTION

RELATED APPLICATION

The present application is based on and claims the benefit of U.S. Provisional Patent Application No. 63/057,510 having a filing date of Jul. 28, 2020, which is incorporated by reference herein.

BACKGROUND

The present disclosure relates generally to object interaction and trajectory prediction. In particular, the present disclosure relates to machine-learned models for object interaction and trajectory prediction that can be used with robotic platforms, for example, autonomous vehicles.

Robots, including autonomous vehicles, can receive data that is used to perceive an environment through which the robot can travel. Robots can rely on machine-learned models to predict motion of other actors within an environment. The effective operation and motion of a robot can depend on accurate future motion prediction provided by the machine-learned models. Better machine-learned training techniques may be needed to improve future motion prediction.

An autonomous vehicle may need to predict the future motion of other actors in the environment to plan a safe and comfortable trajectory to its destination. Additionally, the future motion prediction of other actors may need to be determined over a sufficiently long-time horizon to allow the autonomous vehicle to plan out complex maneuvers, such as making a lane change in dense traffic or navigating a four-way stop intersection with other vehicles. Future motion prediction can be particularly challenging in busy scenes with many interacting agents, including the autonomous vehicle itself.

SUMMARY

Aspects and advantages of embodiments of the present disclosure will be set forth in part in the following description, or may be learned from the description, or may be learned through practice of the embodiments.

As an example, aspects of the present disclosure provide a computing system including one or more processors and one or more computer-readable medium. The computer-readable medium can store instructions that when executed by the one or more processors cause the computing system to perform operations. The operations can include obtaining object data associated with a first object and a second object. The object data can have position data and velocity data for the first object and the second object. Additionally, the operations can include processing, using a graph generator, the obtained object data to generate a hybrid graph. The hybrid graph can have a first node indicative of the first object and a second node indicative of the second object. Moreover, the operations can include processing, using an interaction prediction model, the generated hybrid graph to predict an interaction type between the first node and the second node. The operations can include processing, using a graph neural network model, the predicted interaction type between the first node and the second node to predict a trajectory of the first object.

As another example, aspects of the present disclosure provide one or more non-transitory computer-readable media that store a machine-learned prediction model that has been learned by performance of operations. The operations can include obtaining object data associated with a first object and a second object. The object data can have position data and velocity data for the first object and the second object. The operations can include obtaining traffic element data associated with a traffic element. The traffic element data can have map data of an area surrounding the traffic element. The operations can include processing the obtained object data and the obtained traffic element data to generate a hybrid graph. The hybrid graph can have a first node indicative of the first object, a second node indicative of the second object, and a third node indicative of the traffic element. The operations can include processing, using the prediction model, the generated hybrid graph to predict an interaction type between the first node and the second node and to predict an interaction type between the first node and the third node. The operations can include processing, using the prediction model, the predicted interaction type between the first node and the second node, and the predicted interaction type between the first node and the third node to predict a trajectory of the first object.

As yet another example, aspects of the present disclosure provide a computer-implemented method for predicting a trajectory of an object. The method can include obtaining object data associated with a first object and a second object. The object data can include position data and velocity data for the first object and the second object. The method can further include processing the obtained object data using a graph generator to generate a hybrid graph. The hybrid graph can include a first node indicative of the first object and a second node indicative of the second object. Additionally, the method can include processing, using an interaction prediction model, the generated hybrid graph to predict an interaction type between the first node and the second node. Moreover, the method can include processing, using a graph neural network model, the predicted interaction type between the first node and the second node to predict a trajectory of the first object.

In some implementations, the method includes implementing a motion plan for the second object based on the predicted trajectory of the first object.

In some implementations, the method includes determining a loss function based on the interaction type between the first node and the second node. The method can further include modifying one or more of parameter values of the interaction prediction model based at least in part on the loss function.

In some implementations, the method includes obtaining traffic element data associated with a traffic element. The traffic element data can have map data of an area surrounding the traffic element. The method can further include processing, using a graph generator, the obtained traffic element data to generate the hybrid graph. The hybrid graph can have a third node indicative of the traffic element. Additionally, the method can include processing, using the interaction prediction model, the generated hybrid graph to predict an interaction type between the first node and the third node. Moreover, the method can include processing, using the graph neural network model, the predicted interaction type between the first node and the third node to predict a trajectory of the first object.

In some implementations, the method includes processing, using the interaction prediction model, the generated hybrid graph to predict an interaction type between the first node and the third node when the first object is less than a predefined distance from the traffic element, and an interaction type between the second node and third node when the second object is less than the predefined distance from the traffic element. Additionally, the method can include determining a cross-entropy loss function based at least in part on the interaction type between the first node and the second node, the interaction type between the first node and third node, or the interaction type between the second node and third node. Moreover, the method can include modifying one or more of parameter values of the interaction prediction model based at least in part on the cross-entropy loss function.

In some implementations, the method includes processing, using the interaction prediction model, the generated hybrid graph to predict an interaction type between the first node and the third node, and an interaction type between the second node and the third node. Additionally, the method can include processing, using the graph neural network model, the interaction type between the first node and the second node, the interaction type between the first node and third node, or the interaction type between the second node and third node to predict a trajectory of the first node and a trajectory of the second node. Moreover, the method can include determining a Huber loss function based on the predicted trajectory of the first node or the predicted trajectory of the second node. Subsequently, the method can include modifying one or more of parameter values of the graph neural network model based at least in part on the Huber loss function.

In some implementations, when the obtained traffic element data indicates that a traffic light state of the traffic element is an unknown traffic light, the method can further include determining, using a light prediction model, that the traffic light state of the traffic element is either a green traffic light, a yellow traffic light, or a red traffic light. Additionally, the method can include updating, using the graph generator, the generated hybrid graph based on the determined traffic light state. Moreover, the method can include updating, using the interaction prediction model, the interaction type between the first object and the second object based on the updated hybrid graph. Subsequently, the method can include updating, using the graph neural network model, the predicted trajectory of the first object based on the updated interaction type between the first object and the second object.

In some instances, the map data can include lane boundary data, left turn region data, right turn region data, motion path data, drivable area data, intersection data. Additionally, the traffic element can be a red traffic light, a yellow traffic light, a green traffic light, an unknown traffic light, a stop sign, or a yield sign. Moreover, the interaction type between the first node and the second node can be (i) for the first object to ignore when the predicted trajectory of the first object and the predicted trajectory of the second object do not intersect, (ii) for the first object to go when the predicted trajectory of the first object and the predicted trajectory of the second object do intersect and the first object arrives at the traffic element before the second object, or (iii) for the first object to yield when the predicted trajectory of the first object and the predicted trajectory of the second object do intersect and the first object arrives at the traffic element after the second object.

In some instances, the first object can be a first vehicle and the second object can be a second vehicle. Additionally, the first vehicle and the second vehicle can both be moving vehicles, and parked vehicles are not included as nodes in the generated hybrid graph.

In some instances, the hybrid graph can include a directional edge from the first node and the second node. The directional edge can have a relative position and velocity of the first object in relation to the second object. Additionally, the hybrid graph can include past trajectory data of the first node associated with the past trajectory of the first object.

Other example aspects of the present disclosure are directed to other systems, methods, vehicles, apparatuses, tangible non-transitory computer-readable media, and devices for generating data (e.g., hybrid graphs), training models, and performing other functions (e.g., predicting interactions between objects, predicting a trajectory or motion of an object) described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which refers to the appended figures, in which.

DETAILED DESCRIPTION

Figure 1:
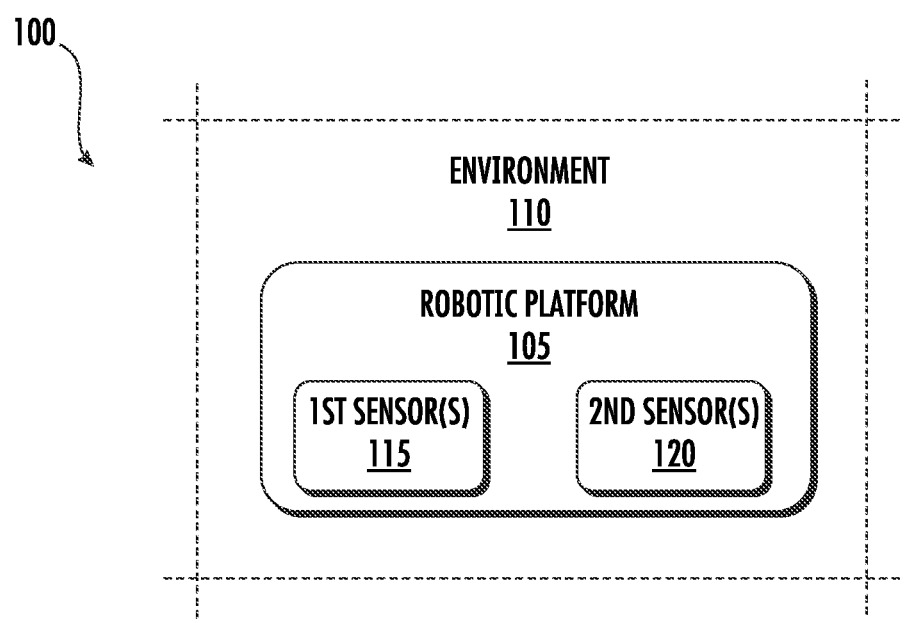
FIG. 1 depicts a block diagram of a computing platform, according to some implementations of the present disclosure.

Aspects of the present disclosure are directed to improved systems and methods for predicting motion of an object such as, for example, predicting a trajectory of one or more objects in an environment and implementing a motion plan for the one or more objects based on the predicted trajectory. An interaction prediction model to predict an interaction between two objects and a trajectory prediction model (e.g., graph neural network model) to predict a future trajectory of an object (e.g., a vehicle) in a traffic scene are described herein. The trajectory prediction model can predict the future trajectory of the vehicle based on the discrete interactions between different vehicle actors (e.g., vehicles with an intent to move) and traffic elements (e.g., traffic light, stop sign, yield sign). The discrete interaction prediction model can predict a discrete interaction (i.e., ignoring, going, yielding) between a vehicle actor and a traffic element using a hybrid graph representation of the vehicle actors and traffic elements in an environment. For example, each vehicle actor and traffic element can be a node in the hybrid graph. Each node can be modeled to include information associated with a past trajectory, map raster, and current trajectory. Additionally, a node can be connected to another node by a directional edge that includes spatial information (e.g., relative position and velocity between the two nodes). The discrete interaction between two nodes can be predicted based on past trajectory, current trajectory, map raster, and spatial information of each node.

Behavior prediction of objects (e.g., actors) can be an essential component of any real-world self-driving system. The long-term behaviors of actors (e.g., vehicles with intent to move) tend to be governed by their interactions with other actors or traffic elements (traffic lights, stop signs) in the scene. The systems and methods described herein can generate a hybrid graph having map rasters to encode contextual information in a traffic scene. The nodes in the hybrid graph can consist of the dynamic actors, static traffic elements and dynamic traffic elements present in the environment. In conventional systems, nodes of hybrid graphs may only be associated with a vehicle and not include static traffic elements and dynamic static traffic elements. The interactions among actors and traffic elements can be modeled by graph edges. The representation of interaction edges can help in predicting trajectories of objects, and enhances the interpretability of the model, which can be tremendously beneficial for applications such as autonomous driving. In some instances, the trajectories and discrete interaction types of the actors can be predicted using a graph neural network, which can be trained in a semi-supervised manner. The techniques described herein using the interaction prediction model and the graph neural network model can achieve state-of-art prediction accuracy and maintain a high level of interpretability.

As background, the future motion of a vehicle over short-term horizons (e.g., 1 to 3 seconds) can be constrained by vehicle dynamics, which can be primarily driven by its current motion. In contrast, over longer-term horizons (e.g., 6 to 10 seconds), vehicle behavior can be primarily driven by its intended destination and its interactions with other actors, traffic signals, and the environment. Observations have shown that the long-term future trajectories of traffic actors can usually follow a set of underlying discrete interaction decisions (e.g., "A yields to B," "B yields to A"). Furthermore, these N-way negotiations can occur between traffic actors but also between traffic actors and traffic elements (e.g., "A stops for a stop sign," "B goes when the light turns green"). The interaction prediction model can identify and categorize the interactions between actors and traffic elements, which can be useful for predicting future motion, and for describing a traffic scene in a human-understandable way.

According to some embodiments, a system using a long-term, interaction-based vehicle trajectory prediction model can be based on a two-stage hybrid graph network whose nodes comprise both traffic actors (including all non-parked vehicles in the scene) and traffic elements (including traffic lights, stop signs, and yield signs). The edges of the hybrid graph can capture semantically meaningful interaction types, allowing information to flow through the graph in an interpretable manner. Using the architecture described herein, the system can demonstrate better performance over existing state-of-the-art methods using internal real-world driving dataset as well as open-source dataset. Furthermore, the system demonstrates improved interpretability based on the ability of the model to adapt to manual perturbations of the interaction decision between two actors (e.g., from 'yield' to 'go') and manual perturbations of traffic light states (e.g., from 'red' to 'green'), which can show what actors can do in hypothetical scenarios. Interpretability is one of the key ingredients necessary for developing and maintaining a safety-critical artificial intelligence system such as a self-driving car.

Aspects of the present disclosure can provide several technical improvements to simulation, robotics, and autonomous vehicle technology. To help improve the performance of a robotic platform, such as an autonomous vehicle, the technology of the present disclosure can improve the motion of an object by improving the trajectory prediction of the object in an environment or improving the trajectory prediction of a surrounding object in the environment. The trajectory prediction is improved at least in part based on an interaction prediction of two objects in the environment.

Systems and methods described herein can improve interpretability further by introducing explicit interaction prediction between pairs of actors. Interpretability is improved by introducing the notion of a hybrid graph whose nodes represent both traffic actors and traffic elements, and whose edges represent the explicit pairwise interactions among them. Moreover, the system can accurately model behaviors of actors in difficult scenarios involving complex interactions with other actors and traffic elements. As a result, the system can achieve state-of-the-art prediction performance while maintaining a high level of interpretability.

As previously mentioned, the representation of interaction edges can help in predicting trajectories of objects, and enhances the interpretability of the model, which can be tremendously beneficial for applications such as autonomous driving. Additionally, the techniques described herein using the interaction prediction model and the graph neural network model can achieve state-of-art prediction accuracy and maintain a high level of interpretability. Moreover, using the architecture described herein, the system can demonstrate better performance over existing state-of-the-art methods using internal real-world driving datasets as well as open-source datasets. The machine-learned models, such as the interaction prediction model and graph neural network model, can learn to predict interactions and trajectories of objects based on sensor data. This, in turn, improves the functioning of simulation, robotics, and autonomous vehicle technologies by increasing the accuracy of the predicted trajectory and increasing the interoperability of the system. Ultimately, the techniques disclosed herein result in more accurate and robust data, thereby improving prediction techniques for a vast array of robotic, vision, or autonomous vehicle technologies.

The following describes the technology of this disclosure within the context of an autonomous vehicle for example purposes only. As described herein, the technology described herein is not limited to an autonomous vehicle and can be implemented within other robotic and computing systems. With reference now to FIGS. 1-8, example embodiments of the present disclosure will be discussed in further detail.

FIG. 1 depicts a block diagram of an example operational scenario 100 according to example implementations of the present disclosure. The operational scenario 100 includes a robotic platform 105 and an environment 110. The environment 110 can be external to the robotic platform 105. The robotic platform 105, for example, can operate within the environment 110. The environment 110 can include an indoor environment (e.g., within one or more facilities) or an outdoor environment. An outdoor environment, for example, can include one or more areas in the outside world such as, for example, one or more rural areas (e.g., with one or more rural travel ways, etc.), one or more urban areas (e.g., with one or more city travel ways, etc.), one or more suburban areas (e.g., with one or more suburban travel ways, etc.), etc. An indoor environment, for example, can include environments enclosed by a structure such as a building (e.g., a service depot, manufacturing facility, etc.).

The robotic platform 105 can include one or more sensor(s) 115, 120. The one or more sensors 115, 120 can be configured to generate or store data descriptive of the environment 110 (e.g., one or more static or dynamic objects therein). The sensors 115, 120 can be configured to obtain object data. For example, the object data can have position data and velocity data for a first object and a second object. The sensors 115, 120 can be configured to obtain traffic element data associated with a traffic element. For example, the traffic element data may include data describing locations of traffic elements (e.g., stop signs or traffic lights) within the environment 110. The locations may be associated with a map of the environment. The sensor(s) 115, 120 can include one or more Light Detection and Ranging (LiDAR) systems, one or more Radio Detection and Ranging (RADAR) systems, one or more cameras (e.g., visible spectrum cameras or infrared cameras), one or more sonar systems, one or more motion sensors, or other types of image capture devices or sensors. The sensor(s) 115, 120 can include multiple sensors of different types. For instance, the sensor(s) 115, 120 can include one or more first sensor(s) 115 and one or more second sensor(s) 120. The first sensor(s) 115 can include a different type of sensor than the second sensor(s) 120. By way of example, the first sensor(s) 115 can include one or more imaging device(s) (e.g., cameras, etc.), whereas the second sensor(s) 120 can include one or more depth measuring device(s) (e.g., LiDAR device, etc.).

The robotic platform 105 can include any type of platform configured to operate with the environment 110. For example, the robotic platform 105 can include one or more different type(s) of vehicle(s) configured to perceive and operate within the environment 110. The vehicles, for example, can include one or more autonomous vehicle(s) such as, for example, one or more autonomous trucks. By way of example, the robotic platform 105 can include an autonomous truck including an autonomous tractor coupled to a cargo trailer. In addition, or alternatively, the robotic platform 105 can include any other type of vehicle such as one or more aerial vehicles, ground-based vehicles, water-based vehicles, space-based vehicles, etc.

Figure 2:
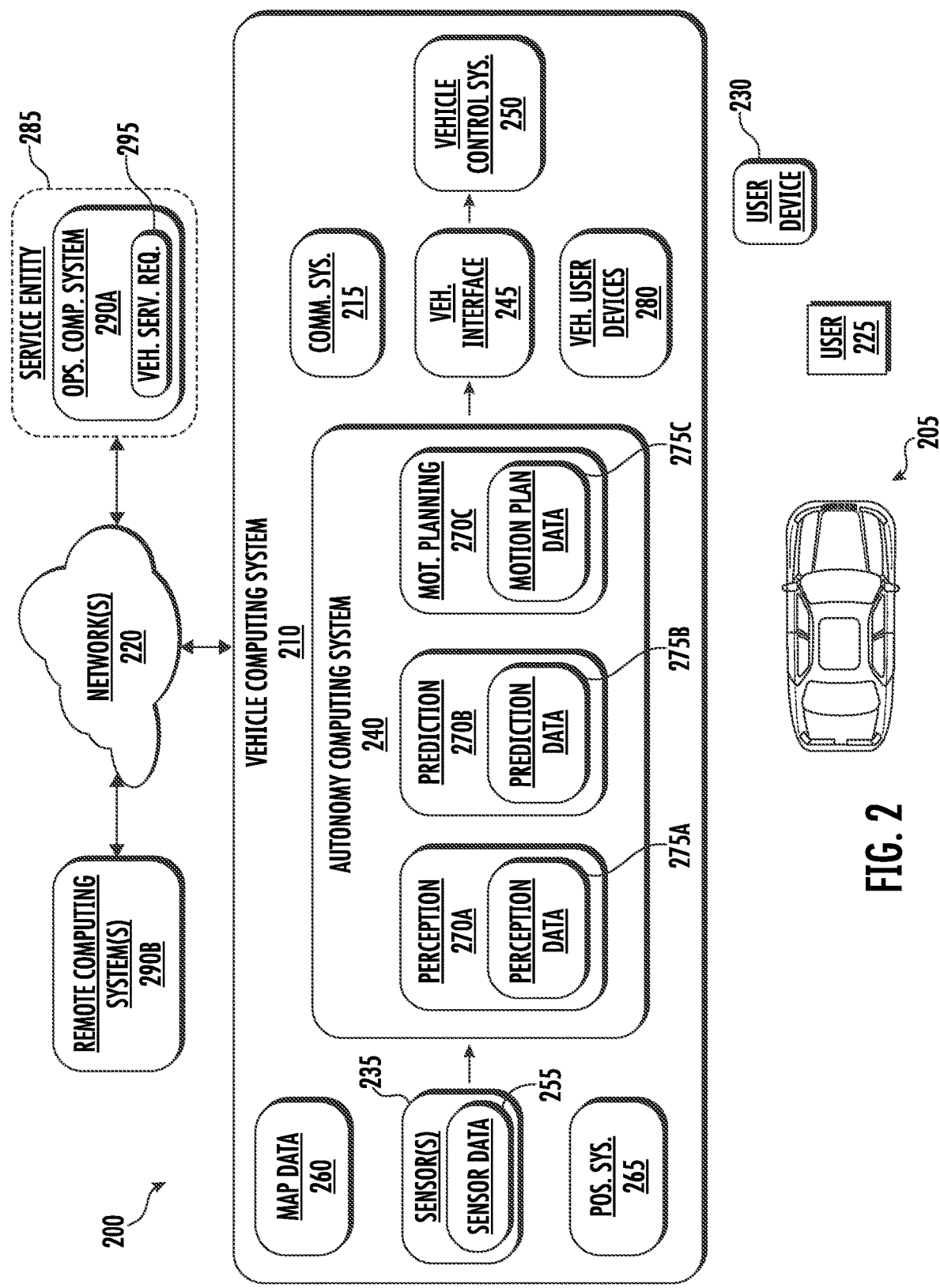
FIG. 2 depicts a block diagram of a system, according to some implementations of the present disclosure.

FIG. 2 depicts an overview of an example system 200 of the robotic platform (e.g., robotic platform 105 of FIG. 1) as an autonomous vehicle according to example implementations of the present disclosure. More particularly, FIG. 2 illustrates a vehicle 205 including various systems and devices configured to control the operation of the vehicle 205. For example, the vehicle 205 can include an onboard vehicle computing system 210 (e.g., located on or within the autonomous vehicle, etc.) that is configured to operate the vehicle 205. Generally, the vehicle computing system 210 can obtain sensor data 255 from a sensor system (e.g., sensor(s) 115, 120 of FIG. 1 and/or sensors 235 of FIG. 2) onboard the vehicle 205, attempt to comprehend the vehicle's surrounding environment by performing various processing techniques on the sensor data 255, and generate an appropriate motion plan through the vehicle's surrounding environment (e.g., environment 110 of FIG. 1).

The vehicle 205 incorporating the vehicle computing system 210 can be various types of vehicles. For instance, the vehicle 205 can be an autonomous vehicle. The vehicle 205 can be a ground-based autonomous vehicle (e.g., car, truck, bus, etc.). The vehicle 205 can be an air-based autonomous vehicle (e.g., airplane, helicopter, vertical takeoff and lift (VTOL) aircraft, etc.). The vehicle 205 can be a lightweight elective vehicle (e.g., bicycle, scooter, etc.). The vehicle 205 can be another type of vehicle (e.g., watercraft, etc.). The vehicle 205 can drive, navigate, operate, etc. with minimal or no interaction from a human operator (e.g., driver, pilot, etc.). In some implementations, a human operator can be omitted from the vehicle 205 (or also omitted from remote control of the vehicle 205). In some implementations, a human operator can be included in the vehicle 205.

The vehicle 205 can be configured to operate in a plurality of operating modes. The vehicle 205 can be configured to operate in a fully autonomous (e.g., self-driving) operating mode in which the vehicle 205 is controllable without user input (e.g., can drive and navigate with no input from a human operator present in the vehicle 205 or remote from the vehicle 205). The vehicle 205 can operate in a semi-autonomous operating mode in which the vehicle 205 can operate with some input from a human operator present in the vehicle 205 (or a human operator that is remote from the vehicle 205). The vehicle 205 can enter into a manual operating mode in which the vehicle 205 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 205 can be configured to operate in other modes such as, for example, park or sleep modes (e.g., for use between tasks/actions such as waiting to provide a vehicle service, recharging, etc.). In some implementations, the vehicle 205 can implement vehicle operating assistance technology (e.g., collision mitigation system, power assist steering, etc.), for example, to help assist the human operator of the vehicle 205 (e.g., while in a manual mode, etc.).

To help maintain and switch between operating modes, the vehicle computing system 210 can store data indicative of the operating modes of the vehicle 205 in a memory onboard the vehicle 205. For example, the operating modes can be defined by an operating mode data structure (e.g., rule, list, table, etc.) that indicates one or more operating parameters for the vehicle 205, while in the particular operating mode. For example, an operating mode data structure can indicate that the vehicle 205 is to autonomously plan its motion when in the fully autonomous operating mode. The vehicle computing system 210 can access the memory when implementing an operating mode.

The operating mode of the vehicle 205 can be adjusted in a variety of manners. For example, the operating mode of the vehicle 205 can be selected remotely, off-board the vehicle 205. For example, a remote computing system (e.g., of a vehicle provider or service entity associated with the vehicle 205) can communicate data to the vehicle 205 instructing the vehicle 205 to enter into, exit from, maintain, etc. an operating mode. By way of example, such data can instruct the vehicle 205 to enter into the fully autonomous operating mode.

In some implementations, the operating mode of the vehicle 205 can be set onboard or near the vehicle 205. For example, the vehicle computing system 210 can automatically determine when and where the vehicle 205 is to enter, change, maintain, etc. a particular operating mode (e.g., without user input). Additionally, or alternatively, the operating mode of the vehicle 205 can be manually selected through one or more interfaces located onboard the vehicle 205 (e.g., key switch, button, etc.) or associated with a computing device within a certain distance to the vehicle 205 (e.g., a tablet operated by authorized personnel located near the vehicle 205 and connected by wire or within a wireless communication range). In some implementations, the operating mode of the vehicle 205 can be adjusted by manipulating a series of interfaces in a particular order to cause the vehicle 205 to enter into a particular operating mode.

The operations computing system 290A can include multiple components for performing various operations and functions. For example, the operations computing system 290A can be configured to monitor and communicate with the vehicle 205 or its users to coordinate a vehicle service provided by the vehicle 205. To do so, the operations computing system 290A can communicate with the one or more remote computing system(s) 290B or the vehicle 205 through one or more communications network(s) including the network(s) 220. The network(s) 220 can send or receive signals (e.g., electronic signals) or data (e.g., data from a computing device) and include any combination of various wired (e.g., twisted pair cable) or wireless communication mechanisms (e.g., cellular, wireless, satellite, microwave, and radio frequency) or any desired network topology (or topologies). For example, the network 220 can include a local area network (e.g., intranet), wide area network (e.g., the Internet), wireless LAN network (e.g., through Wi-Fi), cellular network, a SATCOM network, VHF network, a HF network, a WiMAX based network, or any other suitable communications network (or combination thereof) for transmitting data to or from the vehicle 205.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 205 including sending or receiving data or signals to or from the vehicle 205, monitoring the state of the vehicle 205, or controlling the vehicle 205. The one or more remote computing system(s) 290B can communicate (e.g., exchange data or signals) with one or more devices including the operations computing system 290A and the vehicle 205 through the network 220.

The one or more remote computing system(s) 290B can include one or more computing devices such as, for example, one or more operator devices associated with one or more vehicle providers (e.g., providing vehicles for use by the service entity), user devices associated with one or more vehicle passengers, developer devices associated with one or more vehicle developers (e.g., a laptop/tablet computer configured to access computer software of the vehicle computing system 210), etc. One or more of the devices can receive input instructions from a user or exchange signals or data with an item or other computing device or computing system (e.g., the operations computing system 290A). Further, the one or more remote computing system(s) 290B can be used to determine or modify one or more states of the vehicle 205 including a location (e.g., a latitude and longitude), a velocity, an acceleration, a trajectory, a heading, or a path of the vehicle 205 based in part on signals or data exchanged with the vehicle 205. In some implementations, the operations computing system 290A can include the one or more remote computing system(s) 290B.

The vehicle computing system 210 can include one or more computing devices located onboard the vehicle 205. For example, the computing device(s) can be located on or within the vehicle 205. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 205 (e.g., its computing system, one or more processors, etc.) to perform operations and functions, such as those described herein for collecting training data, communicating with other computing systems, etc.

The vehicle 205 can include a communications system 215 configured to allow the vehicle computing system 210 (and its computing device(s)) to communicate with other computing devices. The communications system 215 can include any suitable components for interfacing with one or more network(s) 220, including, for example, transmitters, receivers, ports, controllers, antennas, or other suitable components that can help facilitate communication. In some implementations, the communications system 215 can include a plurality of components (e.g., antennas, transmitters, or receivers) that allow it to implement and utilize multiple-input, multiple-output (MIMO) technology and communication techniques.

The vehicle computing system 210 can use the communications system 215 to communicate with one or more computing device(s) that are remote from the vehicle 205 over one or more networks 220 (e.g., through one or more wireless signal connections). The network(s) 220 can exchange (send or receive) signals (e.g., electronic signals), data (e.g., data from a computing device), or other information and include any combination of various wired (e.g., twisted pair cable) or wireless communication mechanisms (e.g., cellular, wireless, satellite, microwave, and radio frequency) or any desired network topology (or topologies). For example, the network(s) 220 can include a local area network (e.g., intranet), wide area network (e.g., Internet), wireless LAN network (e.g., through Wi-Fi), cellular network, a SATCOM network, VHF network, a HF network, a WiMAX based network, or any other suitable communication network (or combination thereof) for transmitting data to or from the vehicle 205 or among computing systems.

As shown in FIG. 2, the vehicle computing system 210 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN)), on-board diagnostics connector (e.g., OBD-II), or a combination of wired or wireless communication links. The onboard systems can send or receive data, messages, signals, etc. amongst one another through the communication channel(s).

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LiDAR sensor, etc.). The at least two different types of sensor(s) can obtain object data, traffic element data, or multi-modal sensor data indicative of one or more static or dynamic objects within an environment of the vehicle 205. As described herein with reference to the remaining figures, the sensor data can be provided to the operational computing system 290A for use in generating a hybrid graph, predicting interactions between objects, predicting a trajectory of an object, simulation data for robotic platform testing, or training one or more machine-learned models of the vehicle computing system 210.

The sensor(s) 235 can be configured to acquire sensor data 255. The sensor(s) 235 can be external sensors configured to acquire external sensor data. This can include sensor data associated with the surrounding environment of the vehicle 205. The surrounding environment of the vehicle 205 can include/be represented in the field of view of the sensor(s) 235. For instance, the sensor(s) 235 can acquire image or other data of the environment outside of the vehicle 205 and within a range or field of view of one or more of the sensor(s) 235. This can include different types of sensor data acquired by the sensor(s) 235 such as, for example, data from one or more Light Detection and Ranging (LIDAR) systems, one or more Radio Detection and Ranging (RADAR) systems, one or more cameras (e.g., visible spectrum cameras, infrared cameras, etc.), one or more motion sensors, one or more audio sensors (e.g., microphones, etc.), or other types of imaging capture devices or sensors. The one or more sensors can be located on various parts of the vehicle 205 including a front side, rear side, left side, right side, top, or bottom of the vehicle 205. The sensor data 255 can include image data (e.g., 2D camera data, video data, etc.), RADAR data, LIDAR data (e.g., 3D point cloud data, etc.), audio data, or other types of data. The vehicle 205 can also include other sensors configured to acquire data associated with the vehicle 205. For example, the vehicle 205 can include inertial measurement unit(s), wheel odometry devices, or other sensors.

The sensor data 255 can be indicative of one or more objects within the surrounding environment of the vehicle 205. The object(s) can include, for example, vehicles, pedestrians, bicycles, or other objects. The object(s) can be located in front of, to the rear of, to the side of, above, below the vehicle 205, etc. The sensor data 255 can be indicative of locations associated with the object(s) within the surrounding environment of the vehicle 205 at one or more times. The object(s) can be static objects (e.g., not in motion) or dynamic objects/actors (e.g., in motion or likely to be in motion) in the vehicle's environment. The sensor data 255 can also be indicative of the static background of the environment. The sensor(s) 235 can provide the sensor data 255 to the autonomy computing system 240, the remote computing device(s) 290B, or the operations computing system 290A.

In addition to the sensor data 255, the autonomy computing system 240 can obtain map data 260. The map data 260 can provide detailed information about the surrounding environment of the vehicle 205 or the geographic area in which the vehicle was, is, or will be located. For example, the map data 260 can provide information regarding: the identity and location of different roadways, road segments, buildings, or other items or objects (e.g., lampposts, crosswalks or curb); the location and directions of traffic lanes (e.g., the location and direction of a parking lane, a turning lane, a bicycle lane, or other lanes within a particular roadway or other travel way or one or more boundary markings associated therewith); traffic control data (e.g., the location and instructions of signage, traffic lights, or other traffic control devices); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); or any other map data that provides information that assists the vehicle computing system 210 in processing, analyzing, and perceiving its surrounding environment and its relationship thereto. In some implementations, the map data 260 can include high-definition map data. In some implementations, the map data 260 can include sparse map data indicative of a limited number of environmental features (e.g., lane boundaries, etc.). In some implementations, the map data can be limited to geographic area(s) or operating domains in which the vehicle 205 (or autonomous vehicles generally) may travel (e.g., due to legal/regulatory constraints, autonomy capabilities, or other factors).

The vehicle 205 can include a positioning system 265. The positioning system 265 can determine a current position of the vehicle 205. This can help the vehicle 205 localize itself within its environment. The positioning system 265 can be any device or circuitry for analyzing the position of the vehicle 205. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, Wi-Fi access points, etc.) or other suitable techniques. The position of the vehicle 205 can be used by various systems of the vehicle computing system 210 or provided to a remote computing system. For example, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., object data, traffic element data, LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 205. For example, the autonomy computing system 240 can perform functions associated with the following systems: a perception system 270A, a prediction system 270B, and a motion planning system 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction system, a motion planning system, or other systems that cooperate to perceive the surrounding environment of the vehicle 205 and determine a motion plan for controlling the motion of the vehicle 205 accordingly. In some implementations, one or more of the perception system 270A, the prediction system 270B, or the motion planning system 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 205 according to the motion plan (e.g., through the vehicle interface 245, etc.).

The vehicle computing system 210 (e.g., the autonomy computing system 240) can identify one or more objects that are within the surrounding environment of the vehicle 205 based at least in part on the sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 210 (e.g., performing perception functions, using a perception system 270A, etc.) can process the sensor data 255, the map data 260, etc. to obtain perception data 275A. The vehicle computing system 210 can generate perception data 275A that is indicative of one or more states (e.g., current, or past state(s)) of one or more objects that are within a surrounding environment of the vehicle 205. For example, the perception data 275A for each object can describe (e.g., for a given time, time period) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The perception data 275A can be an example of the object data described in FIG. 4 and the traffic element data described in FIG. 5. The vehicle computing system 210 can utilize one or more algorithms or machine-learned model(s), such as the interaction prediction model and the graph neural network model, that are configured to identify object(s) based at least in part on the sensor data 255. This can include, for example, one or more neural networks trained to identify object(s) within the surrounding environment of the vehicle 205 and the state data associated therewith. The perception data 275A can be utilized for functions of the prediction system 270B of the autonomy computing system 240.

The vehicle computing system 210 can be configured to predict a motion of the object(s) within the surrounding environment of the vehicle 205. For instance, the vehicle computing system 210 can generate prediction data 275B associated with such object(s). The prediction data 275B can be indicative of one or more predicted future locations of each respective object. For example, the prediction system 270B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of way points. In some implementations, the prediction data 275B can be indicative of the speed or acceleration at which the respective object is predicted to travel along its associated predicted motion trajectory. The prediction data 275B can be an example of a predicted interaction type between two objects or a predicted trajectory of an object described in FIG. 4. The vehicle computing system 210 can utilize one or more algorithms or machine-learned model(s), such as the interaction prediction model and the graph neural network model, that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 205 based at least in part on the past or current state(s) of those objects as well as the environment in which the objects are located (e.g., the lane boundary in which it is traveling). The prediction data 275B can be utilized for the motion planning functions of motion planning system 270C of the autonomy computing system 240.

The vehicle computing system 210 can determine a motion plan for the vehicle 205 based at least in part on the perception data 275A, the prediction data 275B, or other data. For example, the vehicle computing system 210 can generate motion plan data 275C indicative of a motion plan. The motion plan data 275C can be an example of a predicted trajectory of an object described in FIG. 4. The motion plan data 275C can include vehicle actions (e.g., speed(s), acceleration(s), other actions, etc.) with respect to one or more of the objects within the surrounding environment of the vehicle 205 as well as the objects' predicted movements. The motion plan can include one or more vehicle motion trajectories that indicate a path for the vehicle 205 to follow. A vehicle motion trajectory can be of a certain length or time range. A vehicle motion trajectory can be defined by one or more way points (with associated coordinates). The planned vehicle motion trajectories can indicate the path the vehicle 205 is to follow as it traverses a route from one location to another. Thus, the vehicle computing system 210 can consider a route/route data when performing the motion planning function of motion planning system 270C.

The vehicle computing system 210 can implement an optimization algorithm, machine-learned model (e.g., an interaction prediction model and the graph neural network model) that considers cost data associated with a vehicle action as well as other objective functions (e.g., cost functions based on speed limits, traffic lights, etc.), if any, to determine optimized variables that make up the motion plan. The vehicle computing system 210 can determine that the vehicle 205 can perform a certain action (e.g., pass an object, etc.) without increasing the potential risk to the vehicle 205 or violating any traffic laws (e.g., speed limits, lane boundaries, signage, etc.). For instance, the vehicle computing system 210 can evaluate the predicted motion trajectories of one or more objects during its cost data analysis to help determine an optimized vehicle trajectory through the surrounding environment. The motion planning system 270C can generate cost data associated with such trajectories. In some implementations, one or more of the predicted motion trajectories or perceived objects may not ultimately change the motion of the vehicle 205 (e.g., due to an overriding factor). In some implementations, the motion plan may define the vehicle's motion such that the vehicle 205 avoids the object(s), reduces speed to give more leeway to one or more of the object(s), proceeds cautiously, performs a stopping action, passes an object, queues behind/in front of an object, etc.

The vehicle computing system 210 can be configured to continuously update the vehicle's motion plan and corresponding planned vehicle motion trajectories. For example, in some implementations, the vehicle computing system 210 can generate new motion plan data 275C/motion plan(s) for the vehicle 205 (e.g., multiple times per second, etc.). Each new motion plan can describe a motion of the vehicle 205 over the next planning period (e.g., next several seconds, etc.). Moreover, a new motion plan may include a new planned vehicle motion trajectory. Thus, in some implementations, the vehicle computing system 210 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 205.

The vehicle computing system 210 can cause the vehicle 205 to initiate a motion control in accordance with at least a portion of the motion plan data 275C. A motion control can be an operation, action, etc. that is associated with controlling the motion of the vehicle 205. For instance, the motion plan data 275C can be provided to the vehicle control system(s) 250 of the vehicle 205. The vehicle control system(s) 250 can be associated with a vehicle interface 245 that is configured to implement a motion plan (e.g., based on a predicted trajectory of an object). The vehicle interface 245 can serve as an interface/conduit between the autonomy computing system 240 and the vehicle control systems 250 of the vehicle 205 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 "X" degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

The vehicle computing system 210 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 205. Additionally, the vehicle 205 can communicate data indicative of the state of the vehicle, the state of one or more passengers of the vehicle, or the state of an environment to a computing system that is remote from the vehicle 205, which can store such information in one or more memories remote from the vehicle 205. Moreover, the vehicle 205 can provide any of the data created or store onboard the vehicle 205 to another vehicle.

The vehicle computing system 210 can include the one or more vehicle user devices 280. For example, the vehicle computing system 210 can include one or more user devices with one or more display devices located onboard the vehicle 205. A display device (e.g., screen of a tablet, laptop, or smartphone) can be viewable by a user of the vehicle 205 that is located in the front of the vehicle 205 (e.g., driver's seat, front passenger seat). Additionally, or alternatively, a display device can be viewable by a user of the vehicle 205 that is located in the rear of the vehicle 205 (e.g., a back passenger seat). The user device(s) associated with the display devices can be any type of user device such as, for example, a table, mobile phone, laptop, etc. The vehicle user device(s) 280 can be configured to function as human-machine interfaces. For example, the vehicle user device(s) 280 can be configured to obtain user input, which can then be utilized by the vehicle computing system 210 or another computing system (e.g., a remote computing system, etc.). For example, a user (e.g., a passenger for transportation service, a vehicle operator, etc.) of the vehicle 205 can provide user input to adjust a destination location of the vehicle 205. The vehicle computing system 210 or another computing system can update the destination location of the vehicle 205 and the route associated therewith to reflect the change indicated by the user input.

As described herein, with reference to the remaining figures, the autonomy computing system 240 can utilize one or more machine-learned models (e.g., an interaction prediction model, a graph neural network model) to perform the functions of perception system 270A, prediction system 270B, or motion planning system 270C. The machine-learned model(s) can be previously trained through one or more machine-learned techniques. The machine-learned models can be previously trained by the one or more remote computing system(s) 290B, the operations computing system 290A, or any other device (e.g., remote servers, training computing systems, etc.) remote from or onboard the vehicle 205. For example, the one or more machine-learned models (e.g., an interaction prediction model, a graph neural network model) can be learned by a training computing system (e.g., the operations computing system 290A, etc.) over training data stored in a training database. The training data can include sequential multi-modal sensor data indicative of a plurality of environments at different time steps. In some implementations, the training data can include object data, traffic element data, hybrid graph data, data generated by the interaction prediction model, data generated by the graph neural network model, and implementation plan associated with a trajectory of an object.

Figure 3:
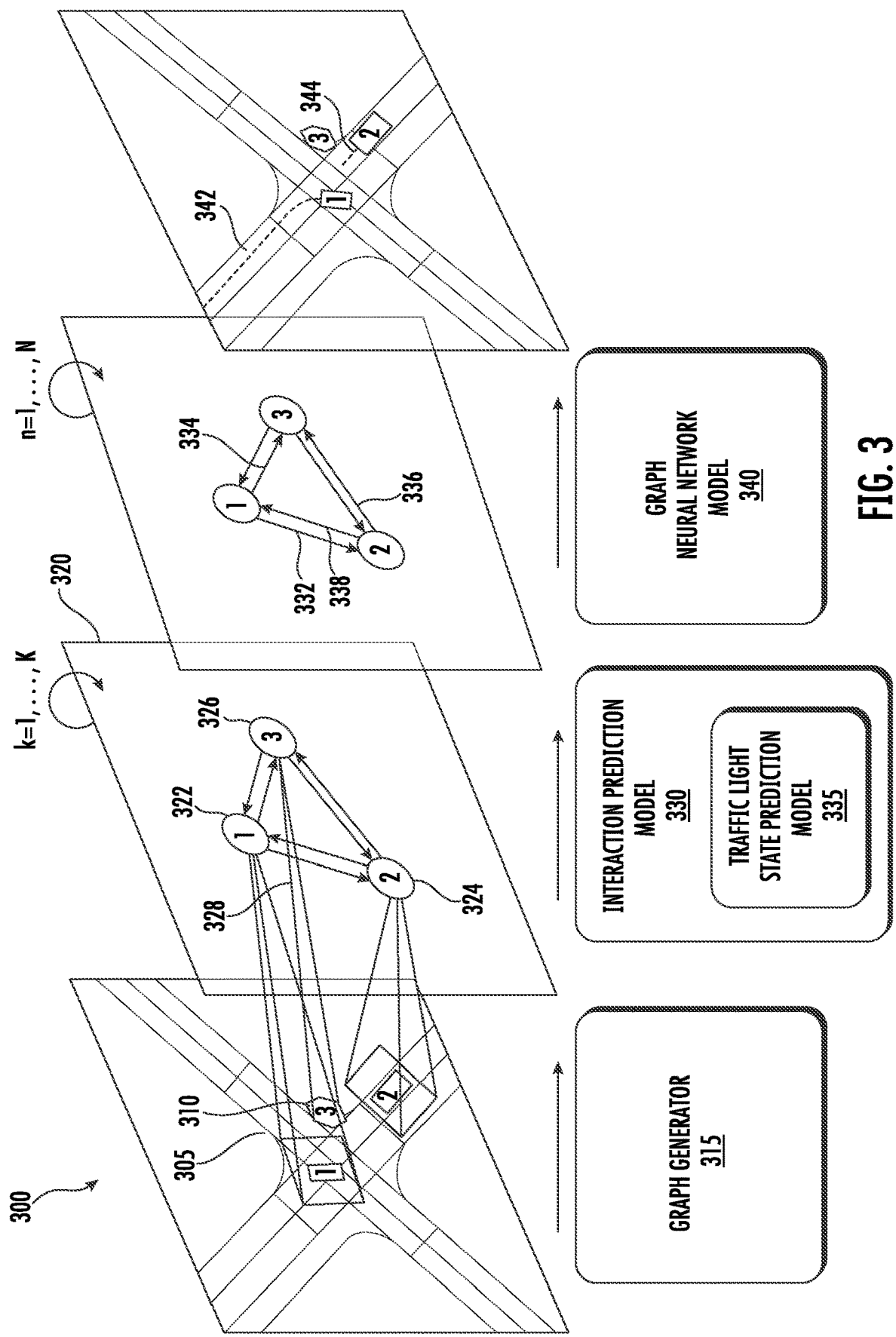
FIG. 3 depicts a machine-learned object interaction and trajectory prediction model, according to some implementations of the present disclosure.

For example, FIG. 3 depicts an example system 300 configured to predict an interaction between two objects and predict a trajectory of an object according to example implementations of the present disclosure. As further described herein, the scene representation can be indicative of at least a portion of an environment in which a robotic platform operates. The system 300 can include any of the system(s) (e.g., robotic platform 105, vehicle 205, vehicle computing system 210, remote computing system 290B, operations computing system 290A, etc.) described herein such as, for example, with reference to FIGS. 1, 2, etc. The system 300 can be configured to predict an interaction between a first object and a second object, and to predict a trajectory of the first object based on the interaction.

According to some embodiments, the system 300 can obtain object data 305 and traffic element data 310 to generate a hybrid graph 320. The hybrid graph 320 can be generated by a graph generator 315. In some instances, the vehicle computing system 210 in FIG. 2 is an example of the system 300, and the object data 305 and the traffic element data 310 can be obtained by the sensor(s) 235 of the vehicle computing system 210. The perception system 270A and the prediction system 270B of FIG. 2 can include the graph generator 315 of FIG. 3. The hybrid graph 320 of FIG. 3 can be stored as the perception data 275A or prediction data 275B of FIG. 2.

Referring still to FIG. 3, in some implementations, the object data 305 can include data (e.g., position data, velocity data) that is indicative of at a dynamic object (e.g., a vehicle with an intent to move) within an environment of a computing system such as, for example, the system 300, an autonomous vehicle (e.g., vehicle 205), a robotic platform (e.g., platform 105), or any other system (or combination thereof) configured to obtain sensor information associated with a real-world environment. In some implementations, the traffic element data 310 can include data (e.g., map data, traffic element state) that is indicative of at a traffic element (e.g., traffic light) within an environment of a computing system such as, for example, the system 300, an autonomous vehicle (e.g., vehicle 205), a robotic platform (e.g., platform 105), or any other system (or combination thereof) configured to obtain sensor information associated with a real-world environment.

The hybrid graph 320 can have a first node 322 indicative of the first object (e.g., first vehicle) and a second node 324 indicative of the second object (e.g., second vehicle). Additionally, the hybrid graph can have a third node 326 indicative of a third object, such as another vehicle (e.g., third vehicle) or a traffic element (e.g., traffic light, stop sign, yield sign). In some instances, the perception system 270A or the prediction system 270B of the vehicle computing system 210 can process the obtained object data 305 and traffic element data 310 to generate a hybrid graph 320. Although hybrid graph 320 of FIG. 3 is depicted as having three nodes, it should be appreciated that the number of nodes in hybrid graph 320 can include a greater or lesser number of nodes depending on the number of objects within an environment.

The hybrid graph 320 can include a directional edge 328 between the first node 322 and the second node 324. The directional edge 328 can have a relative position and velocity of the first object (e.g., represented as first node 322) in relation to the second object (e.g., represented as second node 324). Additionally, the hybrid graph 320 can include past trajectory data of the first node 322 associated with the past trajectory of the first object.

The graph generator 315 can represent a traffic scene by using a hybrid graph 320 with actors and traffic elements as nodes. An actor can be a vehicle in motion or a vehicle with an intention to move, and therefore the vehicle in motion can be a node in the hybrid graph 320. Additionally, a parked vehicle that is parked on a road or in a parking lot may not be included as an actor, and therefore the parked vehicle will not be a node in the hybrid graph 320. Moreover, in one example, the graph generator 315 can consider traffic elements (e.g., stop sign, yield sign, red traffic light, green traffic light, yellow traffic light, unknown traffic light, flashing traffic light, street signs, regulatory signs, warning signs, lane usage signals, road markings, channeling devices, changeable message signs, arrow panels) as nodes in the graph. Unknown traffic lights can be the traffic lights whose current state cannot be observed due to occlusion, glare, poor visibility, and so on. A directional edge (i, j) in the graph can serve as a medium for propagating information from source node i to destination node. All the actor nodes can be connected to each other. In this example, an edge can exist between a traffic element and an actor if the distance between them is less than a predefined threshold of 25 m. This threshold can be set based on the observation that an actor interacts with the traffic elements that are in the proximity of the actor. The hybrid graph 320 enables the system to utilize the inherent structural information present in the environment (e.g., scene) to predict discrete interaction type for each edge and to predict future trajectory conditioned on the interaction type for any number of actors in the scene.

Continuing with the example, the nodes in the hybrid graph can be of different types (e.g., vehicle type actor node and traffic element nodes). Additionally, each node can have access to its own past motion states, such as position and velocity for a predetermined duration and frequency. Given that traffic elements can be stationary, the past states of traffic elements can consist of fixed position and zero velocity. Furthermore, each node can be provided with map data (e.g., map raster) of a certain area (e.g., 40 meter (m)×40 m) at a certain resolution. Each node can have a field of view of a first distance in the front, a second distance in the back and a third distance on each side. Different elements of the map data, such as lane boundaries, left turn region, right turn region and motion paths can be represented in different channels of the map raster. The map raster can provide environmental information, such as driveable areas, intersections, etc. for each node in the hybrid graph 320.

Continuing with the example, the graph generator 315 can include a state encoder module that can encode the past trajectory for each actor. The state encoder can be parameterized as a recurrent neural network (RNN) with a gated recurrent unit (GRU) cell. The past trajectory can be transformed into the node-frame, whose origin can be at the position of the node and the y-axis aligns with the heading direction. Unlike vehicles, traffic elements do not have a concept of heading. The graph generator 315 can compute the heading for traffic elements by calculating the vector from the start location to the end location of their control region. If a traffic element is part of multiple control regions, the graph generator 315 can take the mean vector as the heading direction. For example, a stop sign at a four-way stop intersection can have three control regions, a control region for going straight, a control region for a left turn, and a control region for a right turn. The start point of the control region can be the location of the traffic element itself. The end point can be the location after crossing the intersection which is different for the three control regions.

Continuing with the example, the graph generator 315 can transform the scene map raster for a node into a node frame. The graph generator 315 can transform both the past trajectory and raster to a node frame, which can simplify the input representation for the model and accelerate the convergence of the model. Additionally, the graph generator 315 can include a map encoder module to encode the map raster for each actor. The map encoder module can be parameterized by a five-layer convolutional neural network (CNN) followed by a single fully connected (FC) layer. Subsequently, the graph generator 315 can use a fuse layer to fuse the node type, state, and map encodings together.

The system 300 can process, using an interaction prediction model 330, the hybrid graph 320 to predict an interaction type 332 between the first node 322 and the second node 324, an interaction type 334 between the first node 322 and the third node 326, and an interaction type 336 between the second node 324 and the third node 326. The interaction types can be bi-directional, such that the system 300 can predict an interaction type 338 between the second node 324 and the first node 322 and so on. In some instances, the prediction system 270B can predict the interaction type 332, 334, 336, and 338 using the interaction prediction model 330. The interaction type 332, 334, 336, and 338 can be stored as prediction data 275B.

Examples of interaction type 332 between the first node and the second node can include: (i) for the first object to ignore when the trajectories of the first object and the second object do not intersect, (ii) for the first object to go when the trajectories of the first object and the second object do intersect and the first object arrives at the traffic element before the second object, or (iii) for the first object to yield when the trajectories of the first object and the second object do intersect and the first object arrives at the traffic element after the second object.

The interaction prediction model 330 can be predict discrete interactions between objects. Supervised learning of interaction prediction can require ground-truth labels. Unlike future trajectory, the labels for discrete interaction type may not observed. In some instances, the interaction prediction model 330 can design an auto labeler or heuristic to compute discrete labels for a pair of nodes in the hybrid graph. The label can be determined from the future trajectory of the two objects or nodes. For example, given the trajectories of the objects, the labeling function can output a) $I_{ij}$=IGNORING if trajectories do not intersect, b) $I_{ij}$=GOING if trajectories intersect and i arrives at the intersection point before j, and c) $I_{ij}$=YIELDING if trajectories intersect and i arrives at the intersection point after j.

Given that the graph generator 315 can transform both the past trajectory and map raster for each node in its own frame of reference, the information about the relative states of nodes can be lost. This can be undesirable as the model may need to be aware of the relative configuration of nodes to fully understand the scene and make accurate predictions. The interaction prediction model 330 can preserve spatial information between nodes by introducing edge features for every edge (e.g., interaction type 332, 334, 336, and 338) that comprises of the relative position and velocity of source node with respect to destination node.

Continuing with the example, the interaction prediction model 330 can predict a categorical distribution over the three discrete interaction types for all the edges in the graph. The interaction prediction model 330 can be a graph neural network (GNN) with a node model $f_n^{ip}$ and an edge model $f_n^{ip}$. The edge model can first update the edge embeddings $e_{ij}^k = f_n^{ip}([e_{ij}^{k-1}, h_i^{k-1}, h_j^{k-1}])$ where $h_i^{k-1}$ is the $i^{th}$ node's embeddings for layer k−1 and k=1, ..., K. In this example, $h_i$ can equal 2 layers. The interaction prediction model can then aggregate all the incoming messages for each node and the node model can update the node embeddings $h_i^1 = f_n^{ip}([h_i^{k-1}, \Sigma_{j \in Ni} e_{ji}])$ where $N_i$ is the set of neighbors of node i. The initial node embedding $h_i^1$ is the output $h_i$ of the encoder module. Moreover, the initial edge embedding $e_{ij}^1$ is the relative state of i in the $j^{th}$ node frame. The interaction prediction model 330 can include an output layer $f_o$ to compute the interaction type distribution over each edge as $l_{ij} = (e_{ij}^K)$.

In some instances, a semi-supervised approach can be adopted, where the interaction prediction model 330 only computes labels for actor-actor edges. Additionally, the interaction prediction model 330 use a Cross-Entropy loss over the predicted interaction types. The weights are set in the inverse proportion of label distribution in the dataset. In any driving dataset, the number of ignoring interaction may be much higher than other interaction types. Additionally, setting appropriate weights in the machine-learned model can prevent mode collapse. For example, mode collapse can occur when a model (e.g., the interaction prediction model 330) is over optimized for particular parameters (e.g., incorrect weights for the parameters), and the model starts producing the same output, or a small set of outputs, over and over again because the model is stuck in a local minimum/maximum and cannot determine a global minimum/maximum.

A traffic light state prediction model 335 can predict the state of an unknown traffic light. In some instances, the interaction prediction model 330 can include a traffic light state prediction model 335. Knowledge of the state of a traffic light can be crucial for any autonomous driving system for developing motion plans for the vehicle. Even though traffic light locations are predetermined in HID maps, the state of a traffic light can be unknown due to several factors, such as occlusion, glare, poor visibility, and so on. The traffic light state prediction model 335 can leverage the structural representation of the model with traffic element nodes to predict the state of unknown traffic lights.

For example, the traffic light state prediction model 335 can include a traffic light prediction module $f_{tl}$ to predict a categorical distribution over the three traffic light types (i.e., red, yellow, green) for all traffic light nodes in the graph. The traffic light state prediction model 335 can take as input the node embeddings $h_i^k$ computed by the interaction prediction model 330 and output $\gamma_i = f_{tl}(h_i^k)$ where $\gamma_i$ is the categorical traffic light state distribution for node i.

In some instances, the traffic light state prediction model 335 can use weighted Cross-Entropy loss over the predicted categorical distribution. Additionally, the weights can be set in inverse proportion to their respective class distribution. For example, it can be expected that yellow traffic light state will be less frequent than the red traffic light state and the green traffic light state. In some instances, a semi-supervised approach can be adopted for the traffic light state prediction model 335, where the loss is computed only on known traffic light nodes. Moreover, the state of the traffic light can be provided as input to the traffic light state prediction model 335 in the form of one-hot representation. The traffic light state prediction loss can serve as an auxiliary loss for the traffic light state prediction model 335 and can drive the traffic light state prediction model 335 to make use of the traffic light information to make accurate predictions for a future motion of a vehicle.

The system 300 can process, using a graph neural network model 340, the interaction type 332 between the first node and the second node to predict a trajectory 342 of the first object, and to predict a trajectory 344 the second object. The system 300 can predict a trajectory of any two nodes based in part on the interaction type between the two nodes. In some instances, the prediction system 270B or motion planning system 270C can predict the trajectory 342 and 344 using the graph neural network model 340. The trajectory 342 and trajectory 344 can be stored as prediction data 275B or motion plan data 275C.

The graph neural network model 340 can predict (e.g., rollout) the future trajectory of each node in the hybrid graph 320. The graph neural network model 340 can use a typed graph neural network (GNN) to share information among nodes at each future timestamp in the rollout. The graph neural network model 340 can use a separate edge model $f_d^{e^p}$ for each of the distinct interaction types, hence the name typed GNN. The edge embedding can be computed as a weighted sum of the embeddings from each individual edge model $$e_{ij}^k = \sum_{p=1}^{P} l_{ij}^p f_e^{d^p}([e_{ij}^{k-1}, h_i^{k-1}, h_j^{k-1}])$$

where the weights are the edge scores $l_{ij}^p$ for the corresponding interaction type. The weighted sum can allow the graph neural network model 340 to selectively attend to the different types of interaction and predict trajectories accordingly. Each node then aggregates the incoming messages, and the node model $f_n^d$ updates the node embeddings as $h_i^k = f_n^d([h_i^{k-1}, \Sigma_{j \in N_i} e_{ij}^{k-1}])$ where $N_i$ is the set of neighbors of node i. In this example, K can equal 2 layers. Additionally, the initial edge embedding $e_{ij}^1$ is the relative state of i in the $j^{th}$ node frame where the initial node embedding $h_i^1$ is the final node attributes computed by the interaction prediction model 330.

The graph neural network model 340 can include a recurrent module g that can predict the next state for each node as $s_i^{\tau+1} = g(s_i^\tau, h_i^K)$. For the next timestamp, the graph neural network model 340 can use the predicted state for computing the initial edge features $e_{ij}^1$. Given that the traffic elements remain stationary, the graph neural network model 340 can use the initial known state of the traffic elements instead of the predicted ones when computing the edge features of the nodes associated with the traffic elements. In some instances, the graph neural network model 340 can use Huber loss over the predicted trajectory. Additionally, the graph neural network model 340 can be forced to predict stationary trajectory for traffic elements. The final loss function for the entire model can be written as: $L = D (\hat{S}^{\tau+1:\tau+T}, S^{\tau+1:\tau+T}) + CE(L, \hat{L}) + CE(\gamma, \hat{\gamma})$ where D is the Huber loss between predicted $S^{\tau+1:\tau+T}$ and ground truth $\hat{S}^{\tau+1:\tau+T}$ future trajectories from timestamp $\tau+1: \tau+T$, CE is the cross-entropy loss between predicted L and ground-truth $\hat{L}$ interaction types and also between predicted $\gamma$ and ground truth $\hat{\gamma}$ traffic light states.

Additionally, the system 300 can implement a motion plan for the first object based on the trajectory 342. The system 300 can also implement a motion plan for the second object based on the trajectory 344. For example, the vehicle control system 250 can be configured to implement a motion plan of a vehicle based on a predicted trajectory of the vehicle or the predicted trajectory of another vehicle. The vehicle interface 245 can, for example, translate a motion plan into instructions for the appropriate vehicle control component (e.g., acceleration control, brake control, steering control, etc.).

Figure 4:
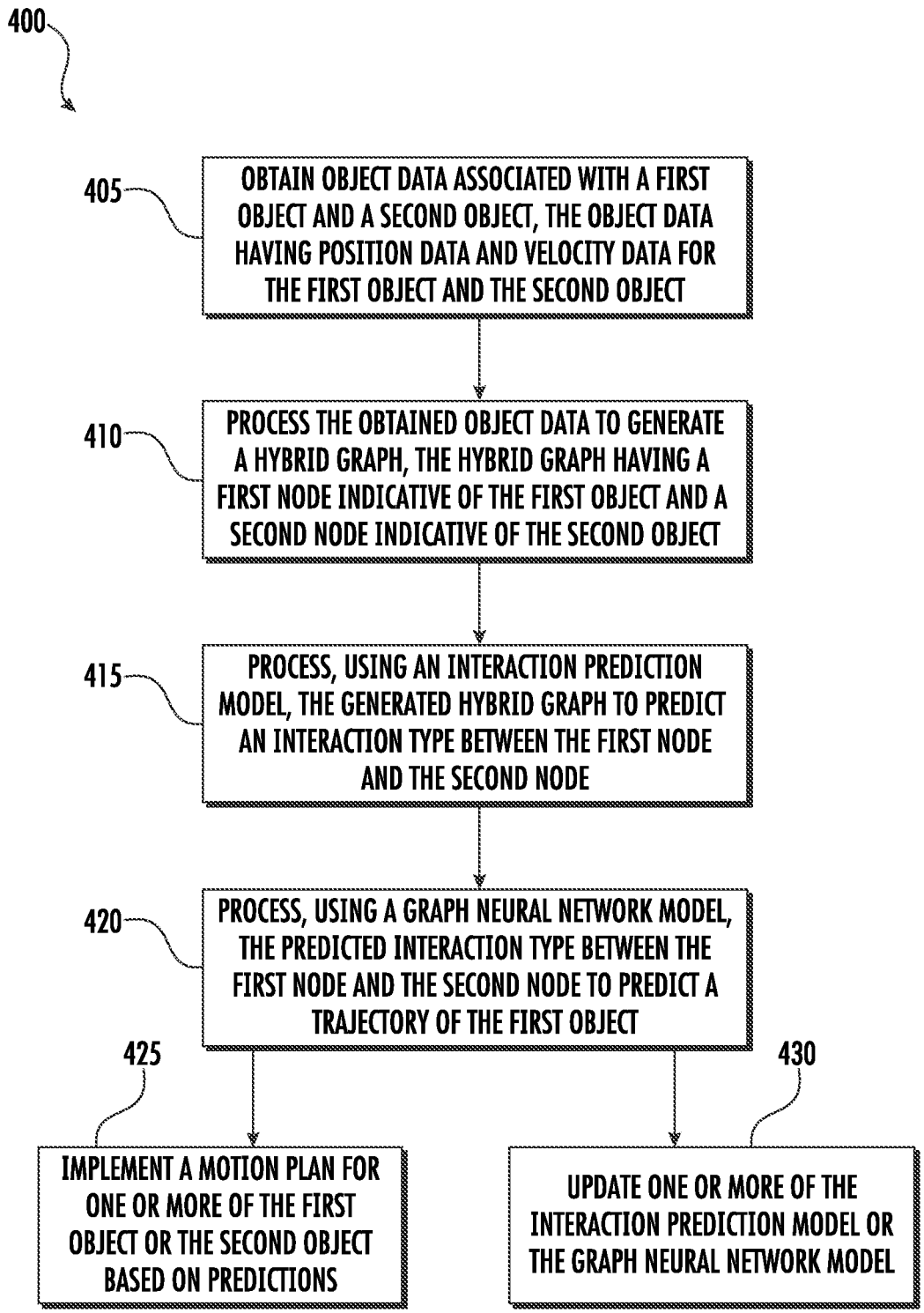
FIG. 4 depicts a method for predicting a trajectory of an object using an object interaction and trajectory prediction, according to some implementations of the present disclosure.

FIG. 4 depicts a flowchart of a method 400 for predicting a trajectory of an object, such as a robot or a vehicle, according to aspects of the present disclosure. One or more portion(s) of the method 400 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 300). Each respective portion of the method 400 can be performed by any (or any combination) of one or more computing devices. Moreover, one or more portion(s) of the method 400 can be implemented as an algorithm on the hardware components of the device(s) described herein (e.g., FIGS. 1-3, 8), for example, to generate a hybrid graph, to predict an interaction type between two objects, or to predict a trajectory of an object.

FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 4 is described with reference to elements/terms described with respect to other systems and figures for exemplary illustrated purposes and is not meant to be limiting. One or more portions of method 400 can be performed additionally, or alternatively, by other systems.

At 405, a computing system can obtain object data associated with a first object and a second object. The object data can have position data and velocity data for the first object. Additionally, the object data can have position data and velocity data for the second object. For example, the first object can be a first vehicle and the second object can be a second vehicle. In some implementations, at least one of the first vehicle or the second vehicle can be an autonomous vehicle that is planning its motion based on a trajectory of the other vehicle.

In some instances, the first object can be a first vehicle, and the second object can be a second vehicle. Additionally, the first vehicle and the second vehicle can be moving vehicles. In some instances, a parked vehicle may not be included as objects in the environment, given that the computing system may not need to predict the trajectory of a parked vehicle. The computing system can assume that the trajectory of the parked vehicle can be the same location as a prior moment with a velocity of zero.

In some instances, the computing system can be the robotic platform 105, vehicle computing system 210, operations computing system(s) 290A, remote computing system(s) 290B, system 300. For example, the sensors 115, 120 of the robotic platform 105 can obtain the object data in environment 110. In another example, the sensor(s) 235 can also obtain the object data. The sensor data 255 described in FIG. 2 can be an example of object data acquired by the sensor(s) 235. For example, the positioning system 265 can determine a current position of the vehicle 205. This can help the vehicle 205 localize itself within its environment. The positioning system 265 can determine position by using one or more of inertial sensors (e.g., inertial measurement unit(s), etc.), a satellite positioning system, based on IP address, by using triangulation or proximity to network access points or other network components (e.g., cellular towers, Wi-Fi access points, etc.) or other suitable techniques. Additionally, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., LIDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

At 410, the computing system can process the object data obtained at 405 to generate a hybrid graph. In some instances, a graph generator (e.g., graph generator 315) can process the object data to generate a hybrid graph at 410. The hybrid graph can have a first node indicative of the first object (e.g., first vehicle) and a second node indicative of the second object (e.g., second vehicle). Additionally, the hybrid graph can have a third node indicative of a third object, such as another vehicle (e.g., third vehicle) or a traffic element (e.g., traffic light, stop sign, yield sign). In some instances, the computing system can process the obtained object data to generate a hybrid graph. As mentioned in the previous example, parked vehicles may not be included as nodes in the hybrid graph that is generated at 410.

In some instances, the hybrid graph can include a directional edge from the first node and the second node. The directional edge can have a relative position and velocity of the first object in relation to the second object. Additionally, the hybrid graph can include past trajectory data of the first node associated with the past trajectory of the first object.

At 415, the computing system can process, using the interaction prediction model, the hybrid graph generated at 410 to predict an interaction type between the first node and the second node. Additionally, the method 400 can further process the hybrid graph, using the interaction prediction model, to predict an interaction type between the first node and the third node. Moreover, the method 400 can further process the hybrid graph, using the interaction prediction model, to predict an interaction type between the second node and the third node. In some instances, the computing system can process, using the interaction prediction model, the generated hybrid graph to predict an interaction type between the first node and the second node, an interaction type between the first node and the third node, and an interaction type between the second node and the third node. In some instances, the interaction prediction model can be a machined-learned interaction prediction model.

In some other instances, the interaction type between the first node and the second node can include: (1) the first node ignoring the second node; (2) the first node going at the intersection point; (3) the first node yielding at the intersection point; (4) the second node ignoring the first node; (5) the second node going at the intersection point; and (6) the second node yielding at the intersection point. Similar variations can be utilized for an interaction type between the first node and the third node, and an interaction type between the second node and the third node At 420, the computing system can process, using the graph neural network model, the interaction type between the first node and the second node predicted at 415 to predict a trajectory of the first object or the second object. The method 400 can predict a trajectory of any two nodes based in part on the interaction type between the two nodes. Additionally, the method 400 can further process, using the graph neural network model, the interaction between the first node and the third node to predict a trajectory of the first object or the third object. Moreover, the method 400 can further process, using the graph neural network model, the interaction between the second node and the third node to predict a trajectory of the second object or third object. Furthermore, the method 400 can further process, using the graph neural network model, the interaction between the first node, the second, and the third node to predict a trajectory of the first object, the second, or the third object. For example, the computing system can process, using the graph neural network model, the interaction type between two nodes predicted at 415 to predict a trajectory of two nodes.

In some instances, a predicted trajectory of an object can include vehicle actions (e.g., speed(s), acceleration(s), other actions, etc.) with respect to one or more of the objects within the surrounding environment of the object (e.g., vehicle 205) as well as the objects' predicted movements. The motion plan can include one or more vehicle motion trajectories that indicate a path for the vehicle 205 to follow. A vehicle motion trajectory can be of a certain length or time range. A vehicle motion trajectory can be defined by one or more way points (with associated coordinates). The planned vehicle motion trajectories can indicate the path the vehicle 205 is to follow as it traverses a route from one location to another.

In some instances, at 425 the method 400 can implement a motion plan for the first object based on the trajectory of the first object predicted at 420. The method 400 can also implement a motion plan for the first object based on the trajectory of the second object predicted at 420. The method 400 can also implement a motion plan for the second object based on the trajectory of the second object predicted at 420. For example, the vehicle control system 250 can be configured to implement a motion plan of a vehicle based on a predicted trajectory of the vehicle or the predicted trajectory of another vehicle. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 "X" degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

In some instances, at 430 the method 400 can update one or more of the interaction prediction model or the graph neural network model based on the predictions determined at 415 and/or 420. In some instances, updating a model (e.g., the interaction prediction model 330, the graph neural network model 340) can include determining a loss function based on the interaction type between the first node and the second node that is predicted at 415. Additionally, the method 400 can modify at 430 one or more parameter values of the interaction prediction model based at least in part on the loss function. The loss function can be a weighted Cross-Entropy loss over the predicted interaction types. For example, the computing system can determine the loss function and modify one or more of the parameter values of the interaction prediction model based on the loss function. As such, one or more of the interaction prediction model or the graph neural network model can utilize predictions from method 400 to further train and/or optimize one or more of the models.

Figure 5:
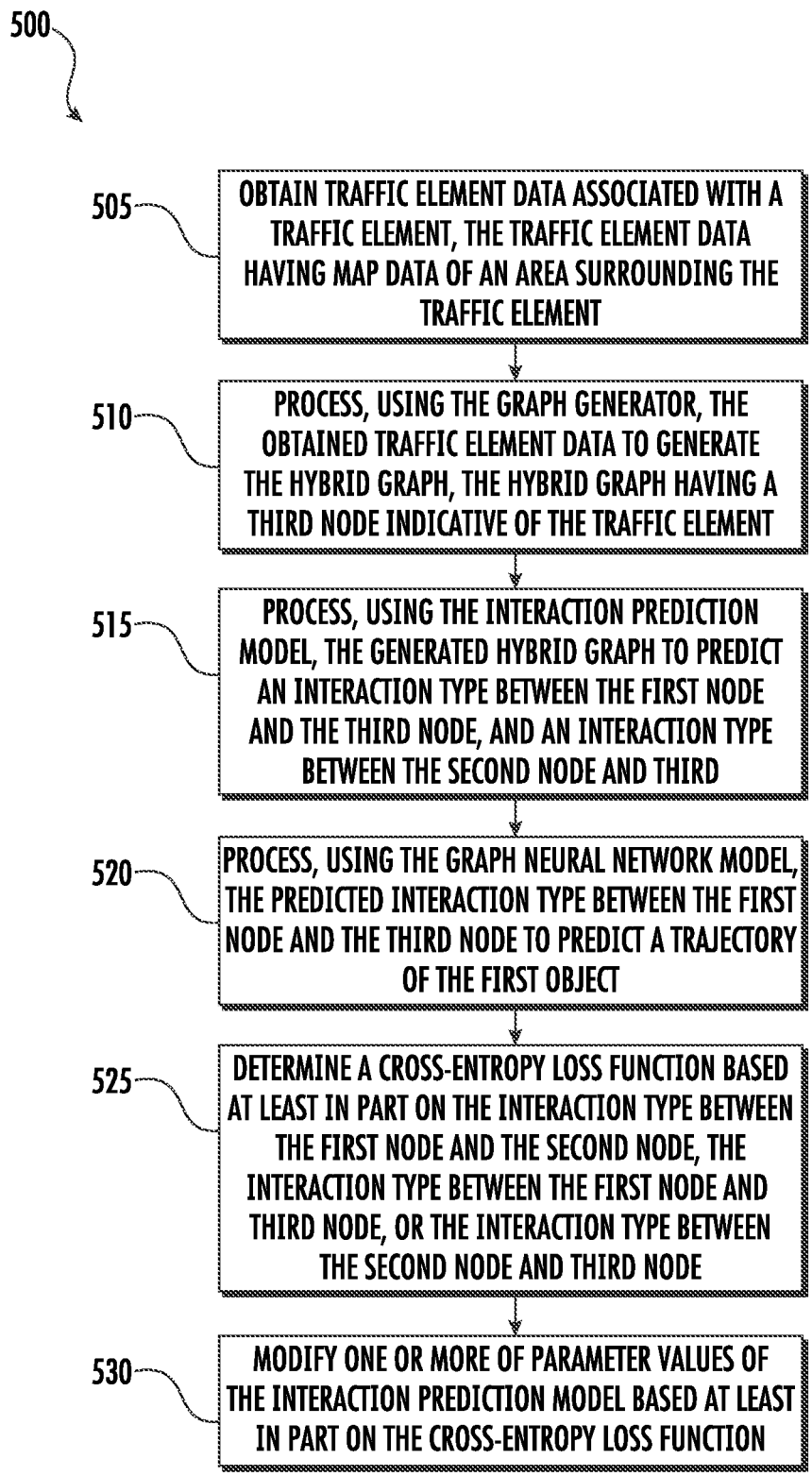
FIG. 5 depicts a flowchart of a method for training an interaction prediction model and for predicting a trajectory of an object, according to some implementations of the present disclosure.

The method 400 can be further modified by one or more portion(s) of method 500 in FIG. 5. For example, one or more portions of method 500 can be performed in addition to the method 400. FIG. 5 depicts another flowchart of a method 500 for predicting a trajectory of an object and training an interaction prediction model, according to aspects of the present disclosure. One or more portion(s) of the method 500 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 300). Each respective portion of the method 500 can be performed by any (or any combination) of one or more computing devices. Moreover, one or more portion(s) of the method 500 can be implemented as an algorithm on the hardware components of the device(s) described herein (e.g., FIGS. 1-3, 8). Those of ordinary skill in the art, using the disclosures provided herein, will understand that the elements of any of the methods discussed herein can be adapted, rearranged, expanded, omitted, combined, or modified in various ways without deviating from the scope of the present disclosure.

FIG. 5 is described with reference to elements/terms described with respect to other systems and figures for exemplary illustrated purposes and is not meant to be limiting. One or more portions of method 500 can be performed additionally, or alternatively, by other systems.

At 505, a computing system can obtain traffic element data associated with a traffic element. For example, the traffic element can be a traffic light, a stop sign, a yield sign. The traffic light can be a red traffic light, yellow traffic light, a green traffic light, or an unknown traffic light. An unknown traffic light can occur when visibility is poor and a robot (e.g., autonomous vehicle) cannot determine the color of the traffic light. Additionally, the traffic element data can have map data (e.g., map data 260) of an area surrounding the traffic element. For example, traffic element data can include a field of view of about 30 m in the front, 10 m in the back and 20 m on each side of the traffic element or robot. In some instances, the traffic element data can include lane boundary data, left turn region data, right turn region data, motion path data, drivable area data, and/or intersection data. For example, different elements of the map (e.g., lane boundaries, left turn region, right turn region, motion paths) can be represented in different channels of a map raster. The traffic element data can include the map raster. The map raster can provide environmental information (e.g., driveable areas, intersection) to each node in the graph. For example, the sensors 115, 120 of robotic platform 105 can obtain the traffic data in environment 110. In another example, the sensor(s) 235 can also obtain the traffic element data. The sensor data 255 described in FIG. 2 can be an example of traffic element data acquired by the sensor(s) 235. The map data 260 described in FIG. 2 can be an example of the map data obtained at 505.

At 510, the computing system can process, using a graph generator, the obtained traffic element data to generate a hybrid graph or update the hybrid graph generated at 410. The hybrid graph can have a third node indicative of the traffic element. The third node can be in addition to the first node indicative of the first object (e.g., first autonomous vehicle) and a second node indicative of the second object (e.g., second autonomous vehicle) that were generated at 410. Similarly, the hybrid graph can have a node associated with each object in the environment.

At 515, the computing system can process, using the interaction prediction model, the generated hybrid graph to predict an interaction type between the first node and the third node. As previously mentioned in the method 400, the computing system can predict the interaction type between the first node and the second node at 415. Additionally, the computing system can process, using the interaction prediction model, the generated hybrid graph to predict an interaction type between the first node and the third node, and an interaction type between the second node and third.

In some instances, the interaction type between the first node and the third node can be predicted when the first object is less than a predefined distance from the traffic element. Moreover, the interaction type between the second node and the third node can be predicted when the second object is less than the predefined distance from the traffic element. For example, when a vehicle is more than a predetermined distance (e.g., 25 meters) from a traffic element, the computing system does not need to predict an interaction type between the vehicle and the traffic element because it can be assumed that the vehicle will only interact with traffic elements that are near the vehicle.

At 520, the computing system can process, using the graph neural network model, the predicted interaction type between the first node and the third node to predict a trajectory of the first object. In some instances, the computing system can process, using the graph neural network model, the predicted interaction type between the first node and the third node and the predicted interaction type between the second node and the third node to predict a trajectory of the first object or a trajectory of the second object.

At 530, the computing system can determine a cross-entropy loss function based at least in part on the interaction type between the first node and the second node, the interaction type between the first node and third node, or the interaction type between the second node and third node. In some instances, the computing system can determine a common loss function (e.g., regression loss, mean square loss, mean absolute loss, means bias error, Hinge loss) based at least in part on the interaction type between the first node and the second node, the interaction type between the first node and third node, or the interaction type between the second node and third node.

At 535, the computing system can modify one or more of parameter values of the interaction prediction model based at least in part on the cross-entropy loss function. In some instances, the computing system can modify one or more of parameter values of the interaction prediction model based at least in part on a common loss function.

Figure 6:
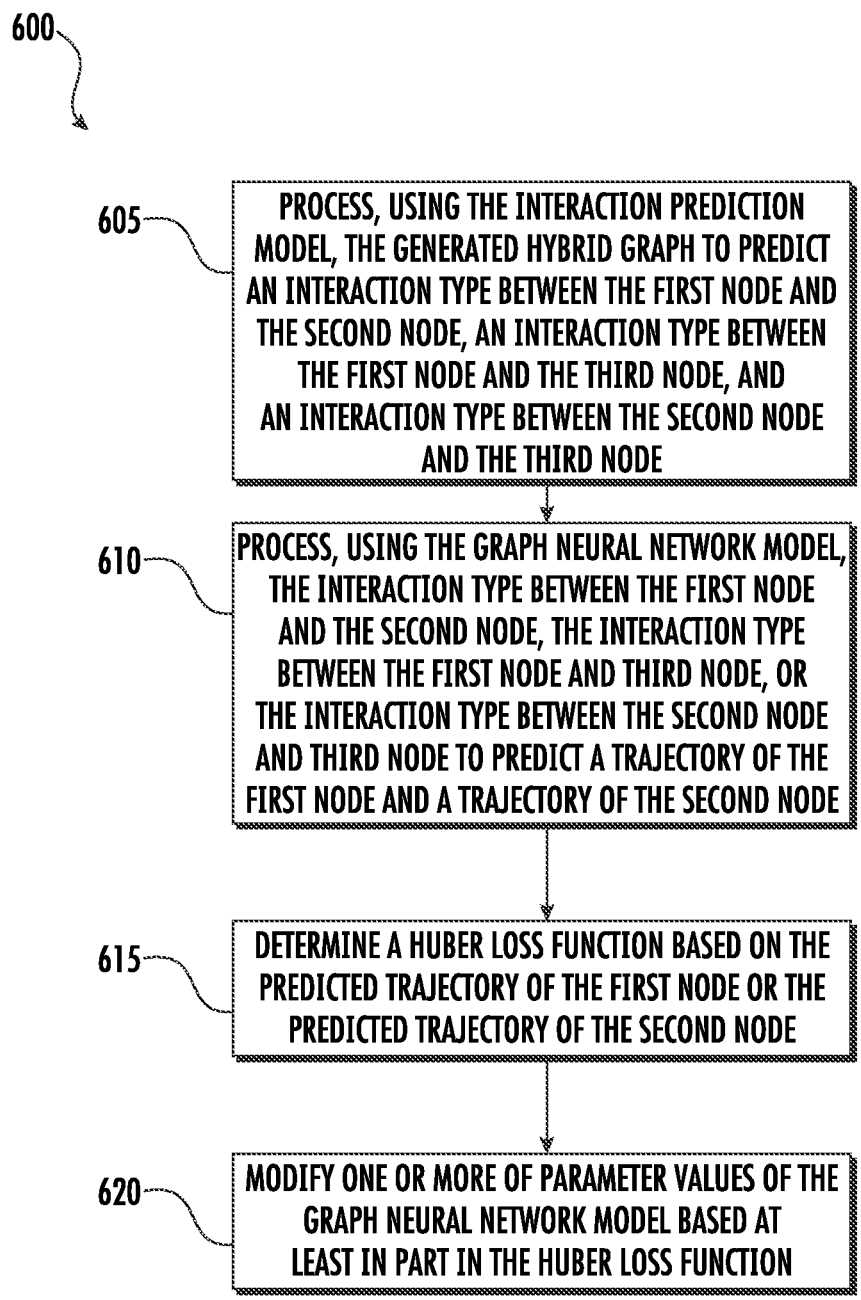
FIG. 6 depicts a flowchart of a method for training a graph neural network model and for predicting a trajectory of an object, according to some implementations of the present disclosure.

The method 400 and the method 500 can be further modified by one or more portion(s) of method 600 in FIG. 6. For example, one or more portions of method 600 can be performed in addition to the method 500. FIG. 6 depicts another flowchart of a method 600 for predicting a trajectory of an object and training an example graph neural network model, according to aspects of the present disclosure. One or more portion(s) of the method 600 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 300). Each respective portion of the method 600 can be performed by any (or any combination) of one or more computing devices. Moreover, one or more portion(s) of the method 600 can be implemented as an algorithm on the hardware components of the device(s) described (e.g., FIGS. 1-3, 8). Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 6 is described with reference to elements/terms described with respect to other systems and figures for exemplary illustrated purposes and is not meant to be limiting. One or more portions of method 600 can be performed additionally, or alternatively, by other systems.

At 605, the computing system can process, using the interaction prediction model, the generated hybrid graph to predict an interaction type between the first node and the second node, an interaction type between the first node and the third node, and an interaction type between the second node and the third node. For example, the hybrid graph can be generated at 410 and 510. The computing system can use similar techniques described at 415 and 515 to predict interaction type between two nodes.

At 610, the computing system can process, using the graph neural network model, the interaction type between the first node and the second node, the interaction type between the first node and third node, or the interaction type between the second node and third node to predict a trajectory of the first node and a trajectory of the second node.

At 615, the computing system can determine a Huber loss function based on the predicted trajectory of the first node or the predicted trajectory of the second node. In some instances, the computing system can determine a common loss function (e.g., regression loss, mean square loss, mean absolute loss, means bias error, Hinge loss) based at least in part on the interaction type between based on the predicted trajectory of the first node or the predicted trajectory of the second node.

At 620, the computing system can modify one or more of parameter values of the graph neural network model based at least in part on the Huber loss function. In some instances, the computing system can modify one or more of parameter values of the graph neural network model based at least in part on a common loss function.

Figure 7:
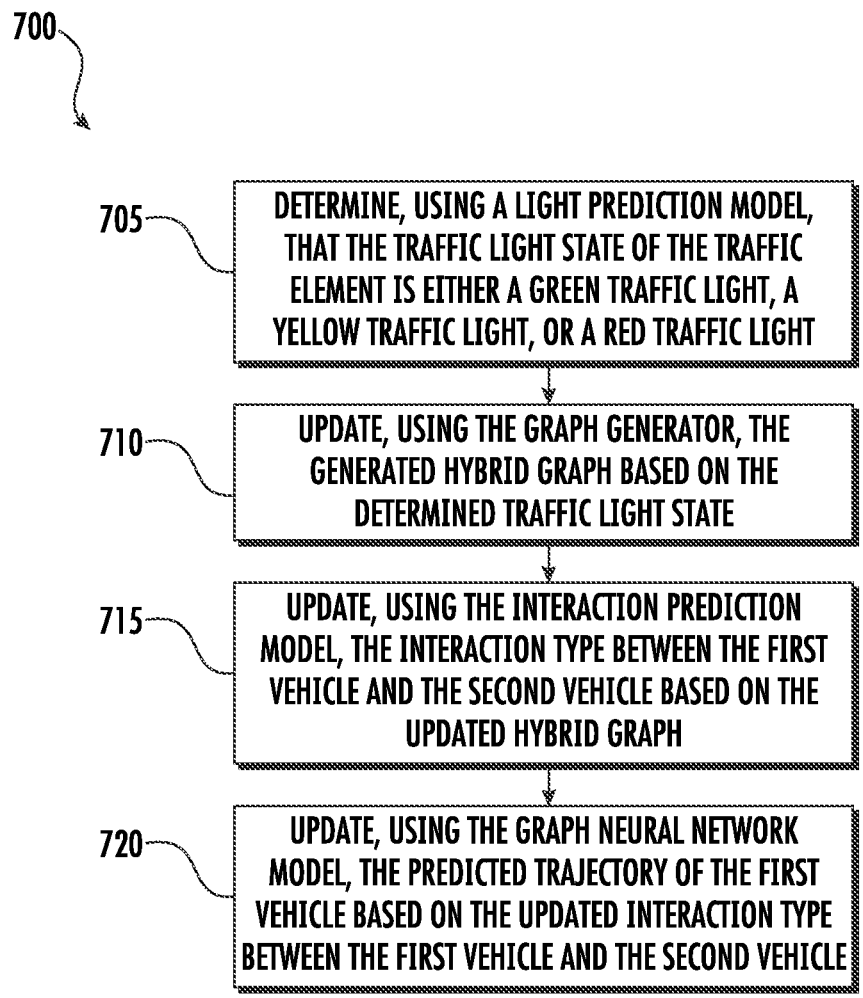
FIG. 7 depicts a flowchart of a method for predicting a trajectory of an object using a traffic light prediction model, according to some implementations of the present disclosure.

The method 400, the method 500, and the method 600 can be further modified by one or more portion(s) of method 700 in FIG. 7. For example, one or more portions of method 700 can be performed in addition to the method 500. FIG. 7 depicts a flowchart of a method 700 for predicting a trajectory of an object using a traffic light prediction model, according to aspects of the present disclosure. One or more portion(s) of the method 700 can be implemented by a computing system that includes one or more computing devices such as, for example, the computing systems described with reference to the other figures (e.g., robotic platform 105, vehicle computing system 210, operations computing system(s) 290A, remote computing system(s) 290B, system 300). Each respective portion of the method 700 can be performed by any (or any combination) of one or more computing devices. Moreover, one or more portion(s) of the method 700 can be implemented as an algorithm on the hardware components of the device(s) described herein (e.g., FIGS. 1-3, 8). Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

In some instances, the traffic element data obtained at 505 in the method 500 can indicate that a traffic light state of the traffic element is an unknown traffic light. By using a light prediction model (e.g., traffic light prediction model), the computing system can determine that the traffic light is either green, yellow, or red. Subsequently, the computing system can determine an interaction type between the object and predict the trajectory of an object based on the traffic light determination.

At 705, the computing system can determine, using a traffic light prediction model, that the traffic light state of the traffic element is either a green traffic light, a yellow traffic light, or a red traffic light. As previously mentioned, the computing system can obtain the traffic element data at 505.

At 710, the computing system can update, using the graph generator, the generated hybrid graph based on the determined traffic light state. In some instances, the hybrid graph that is generated at 410 and 510 can be updated based on the traffic light state determined at 705. For example, a node associated with the unknown traffic light in the hybrid graph can be updated at 710 to traffic light state (e.g., red, green, yellow) based on the determination at 705.

At 715, the computing system can update, using the interaction prediction model, the interaction type between the first vehicle and the second vehicle based on the updated hybrid graph. In some instances, the interaction type between two objects that is predicted at 415, 515, and 605 can be updated at 715 based on the hybrid graph that is updated at 710.

At 720, the computing system can update, using the graph neural network model, the predicted trajectory of the first vehicle based on the updated interaction type between the first vehicle and the second vehicle. In some instances, the trajectory of an object that is predicted at 420, 520, and 610 can be updated at 720 based on the interaction type that is updated at 715.

Figure 8:
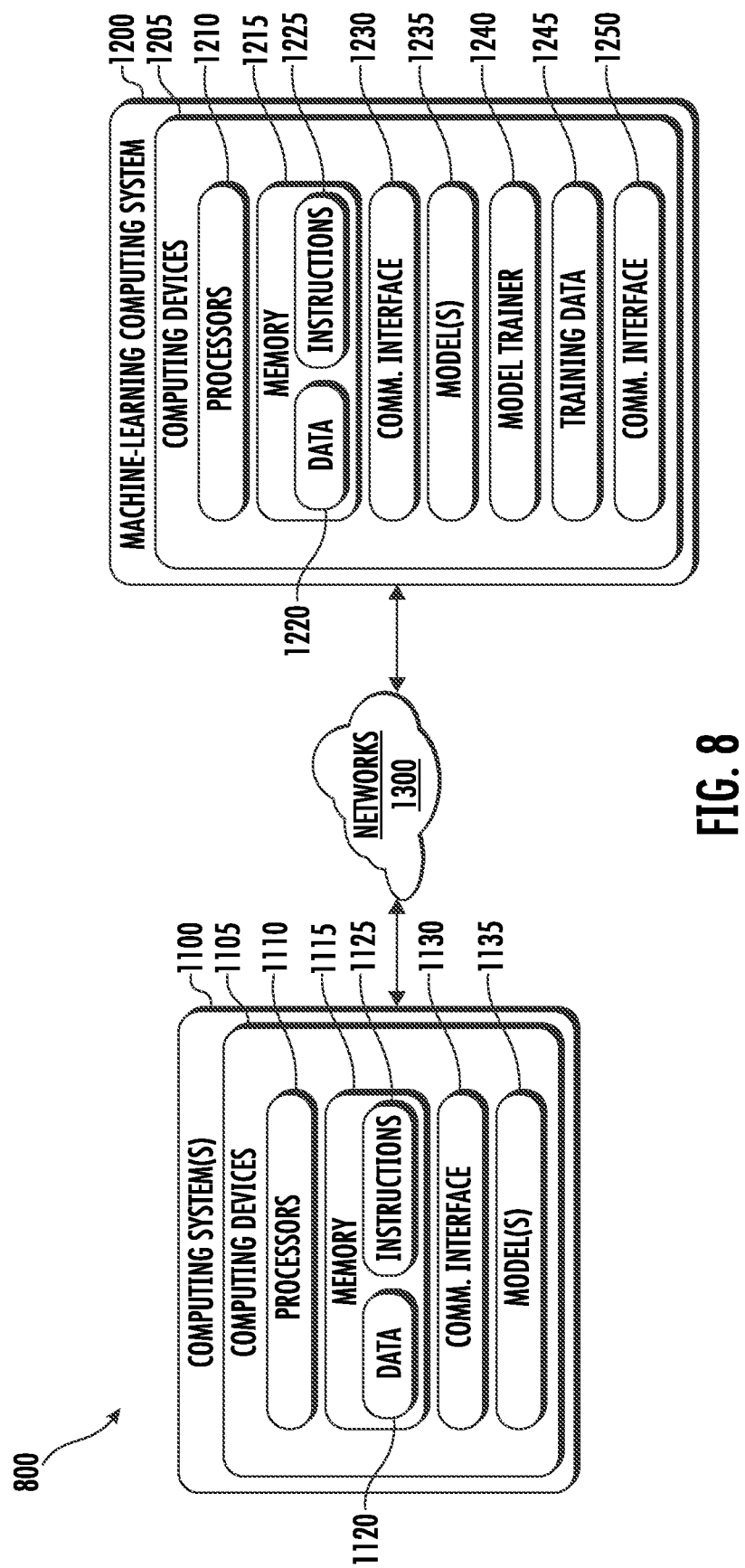
FIG. 8 depicts a block diagram of a computing system, according to some implementations of the present disclosure.

FIG. 8 depicts a block diagram of an example computing system 800 according to example embodiments of the present disclosure. The example computing system 800 includes a computing system 1100 and a machine learning computing system 1200 that are communicatively coupled over one or more networks 1300.

In some implementations, the computing system 1100 can perform one or more observation tasks such as, for example, by obtaining sensor data (e.g., object data, traffic data, multi-modal sensor data) associated with an environment. In some implementations, the computing system 1100 can be included in a robotic platform. For example, the computing system 1100 can be on-board an autonomous vehicle. In other implementations, the computing system 1100 is not located on-board a robotic platform. The computing system 1100 can include one or more distinct physical computing devices 1105.

The computing system 1100 (or one or more computing device(s) 1105 thereof) can include one or more processors 1110 and a memory 1115. The one or more processors 1110 can be any suitable processing device (e.g., a processor core, a microprocessor, an ASIC, a FPGA, a controller, a microcontroller, etc.) and can be one processor or a plurality of processors that are operatively connected. The memory 1115 can include one or more non-transitory computer-readable storage media, such as RAM, ROM, EEPROM, EPROM, one or more memory devices, flash memory devices, etc., and combinations thereof.

The memory 1115 can store information that can be accessed by the one or more processors 1110. For instance, the memory 1115 (e.g., one or more non-transitory computer-readable storage mediums, memory devices) can store data 1120 that can be obtained, received, accessed, written, manipulated, created, or stored. The data 1120 can include, for instance, object data, traffic element data, hybrid graph data, image data, LiDAR data, multi-modal sensor data, models, intermediate and other scene representations, or any other data or information described herein. In some implementations, the computing system 1100 can obtain data from one or more memory device(s) that are remote from the computing system 1100.

The memory 1115 can also store computer-readable instructions 1125 that can be executed by the one or more processors 1110. The instructions 1125 can be software written in any suitable programming language or can be implemented in hardware. Additionally, or alternatively, the instructions 1125 can be executed in logically or virtually separate threads on processor(s) 1110.

For example, the memory 1115 can store instructions 1125 that when executed by the one or more processors 1110 cause the one or more processors 1110 (the computing system 1100) to perform any of the operations, functions, or methods/processes described herein, including, for example, obtain sensor data, generate a hybrid graph, predict an interaction between two objects, predict a trajectory of an object, implement a motion plan, update the interaction prediction model, update the graph neural network model, and so on.

According to an aspect of the present disclosure, the computing system 1100 can store or include one or more machine-learned models 1135. As examples, the machine-learned models 1135 can be or can otherwise include various machine-learned models such as, for example, inpainting networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the computing system 1100 can receive the one or more machine-learned models 1135 from the machine learning computing system 1200 over network(s) 1300 and can store the one or more machine-learned models 1135 in the memory 1115. The computing system 1100 can then use or otherwise implement the one or more machine-learned models 1135 (e.g., by processor(s) 1110). In particular, the computing system 1100 can implement the machine learned model(s) 1135 to generate a hybrid graph, predict an interaction between two objects, predict a trajectory of an object, implement a motion plan, update the interaction prediction model, update the graph neural network model, and so on.

The machine learning computing system 1200 can include one or more computing devices 1205. The machine learning computing system 1200 can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices) can store data 1220 that can be obtained, received, accessed, written, manipulated, created, or stored. The data 1220 can include, for instance, object data, traffic element data, hybrid graph data, multi-modal sensor data, intermediate representations, scene representations, simulation data, data associated with models, or any other data or information described herein. In some implementations, the machine learning computing system 1200 can obtain data from one or more memory device(s) that are remote from the machine learning computing system 1200.

The memory 1215 can also store computer-readable instructions 1225 that can be executed by the one or more processors 1210. The instructions 1225 can be software written in any suitable programming language or can be implemented in hardware. Additionally, or alternatively, the instructions 1225 can be executed in logically or virtually separate threads on processor(s) 1210.

For example, the memory 1215 can store instructions 1225 that when executed by the one or more processors 1210 cause the one or more processors 1210 (the computing system) to perform any of the operations or functions described herein, including, for example, training a machine-learned object removal model, generating simulation data, etc.

In some implementations, the machine learning computing system 1200 includes one or more server computing devices. If the machine learning computing system 1200 includes multiple server computing devices, such server computing devices can operate according to various computing architectures, including, for example, sequential computing architectures, parallel computing architectures, or some combination thereof.

In addition, or alternatively to the model(s) 1235 at the computing system 1100, the machine learning computing system 1200 can include one or more machine-learned models 1235. As examples, the machine-learned models 1235 can be or can otherwise include various machine-learned models such as, for example, inpainting networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the machine learning computing system 1200 or the computing system 1100 can train the machine-learned models 1135 or 1235 through use of a model trainer 1240. The model trainer 1240 can train the machine-learned models 1135 or 1235 using one or more training or learning algorithms. One example training technique is backwards propagation of errors. In some implementations, the model trainer 1240 can perform supervised training techniques using a set of labeled training data. In other implementations, the model trainer 1240 can perform unsupervised training techniques using a set of unlabeled training data. The model trainer 1240 can perform a number of generalization techniques to improve the generalization capability of the models being trained. Generalization techniques include weight decays, dropouts, or other techniques.

In particular, the model trainer 1240 can train a machine-learned model 1135 or 1235 based on a set of training data 1245. The training data 1245 can include, for example, object data, traffic element data, hybrid graph data, data associated with the interaction prediction model, data associated with the graph neural network data, labeled sequential multi-modal sensor data indicative of a plurality of environments at different timesteps, and so on. In some implementations, the training data can include a plurality of environments previously recorded by the autonomous vehicle with dynamic objects removed. The model trainer 1240 can be implemented in hardware, firmware, or software controlling one or more processors.

The computing system 1100 and the machine learning computing system 1200 can each include a communication interface 1130 and 1250, respectively. The communication interfaces 1130/1250 can be used to communicate with one or more systems or devices, including systems or devices that are remotely located from the computing system 1100 and the machine learning computing system 1200. A communication interface 1130/1250 can include any circuits, components, software, etc. for communicating with one or more networks (e.g., 1300). In some implementations, a communication interface 1130/1250 can include, for example, one or more of a communications controller, receiver, transceiver, transmitter, port, conductors, software, or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1300 can be accomplished, for instance, through a network interface using any type of protocol, protection scheme, encoding, format, packaging, etc.

FIG. 8 illustrates one example computing system 1000 that can be used to implement the present disclosure. Other computing systems can be used as well. For example, in some implementations, the computing system 1100 can include the model trainer 1240 and the training data 1245. In such implementations, the machine-learned models 1235 can be both trained and used locally at the computing system 1100. As another example, in some implementations, the computing system 1100 is not connected to other computing systems.

In addition, components illustrated or discussed as being included in one of the computing systems 1100 or 1200 can instead be included in another of the computing systems 1100 or 1200. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein.

What is claimed is:

1. A computing system for an autonomous vehicle, the computing system comprising:
    one or more processors; and
        one or more non-transitory computer-readable medium storing instructions for execution by the one or more processors to cause the computing system to perform operations, the operations comprising:
            obtaining object data associated with a first object and a second object, the object data having position data and velocity data for the first object and the second object;
            processing the obtained object data to generate a hybrid graph, the hybrid graph having a first node indicative of the first object and a second node indicative of the second object;
            processing, using an interaction prediction model, the generated hybrid graph to predict an interaction type for edges in the hybrid graph including an edge between the first node and the second node, wherein the interaction type is predicted from a predetermined set of discrete interaction types;
            processing, using a graph neural network model, the predicted interaction type between the first node and the second node to predict a trajectory of the first object; and
            controlling motion of the autonomous vehicle based on a motion plan determined from the trajectory of the first object.

2. The computing system of claim 1, the operations further comprising:
    determining a loss function based on the interaction type between the first node and the second node; and
    modifying one or more of parameter values of the interaction prediction model based at least in part on the loss function.

3. The computing system of claim 1, the operations comprising:
    obtaining traffic element data associated with a traffic element, the traffic element data having map data of an area surrounding the traffic element;
    processing, using a graph generator, the obtained traffic element data to generate the hybrid graph, the hybrid graph having a third node indicative of the traffic element; and
    processing, using the interaction prediction model, the generated hybrid graph to predict an interaction type between the first node and the third node; and
    processing, using the graph neural network model, the predicted interaction type between the first node and the third node to predict a trajectory of the first object.

4. The computing system of claim 3, the operations further comprising:
    processing, using the interaction prediction model, the generated hybrid graph to predict an interaction type between the first node and the third node when the first object is less than a predefined distance from the traffic element, and an interaction type between the second node and third node when the second object is less than the predefined distance from the traffic element;
    determining a cross-entropy loss function based at least in part on the interaction type between the first node and the second node, the interaction type between the first node and third node, or the interaction type between the second node and third node; and
    modifying one or more of parameter values of the interaction prediction model based at least in part on the cross-entropy loss function.

5. The computing system of claim 3, the operations further comprising:
    processing, using the interaction prediction model, the generated hybrid graph to predict an interaction type between the first node and the third node, and an interaction type between the second node and the third node;
    processing, using the graph neural network model, the interaction type between the first node and the second node, the interaction type between the first node and third node, or the interaction type between the second node and third node to predict a trajectory of the first node and a trajectory of the second node;

determining a Huber loss function based on the predicted trajectory of the first node or the predicted trajectory of the second node; and modifying one or more of parameter values of the graph neural network model based at least in part on the Huber loss function.

6. The computing system of claim 3, wherein the obtained traffic element data indicates that a traffic light state of the traffic element is an unknown traffic light, the operations further comprising:

determining, using a light prediction model, that the traffic light state of the traffic element is either a green traffic light, a yellow traffic light, or a red traffic light;

updating, using the graph generator, the generated hybrid graph based on the determined traffic light state;

updating, using the interaction prediction model, the interaction type between the first object and the second object based on the updated hybrid graph; and updating, using the graph neural network model, the predicted trajectory of the first object based on the updated interaction type between the first object and the second object.

7. The computing system of claim 3, wherein the map data includes lane boundary data, left turn region data, right turn region data, motion path data, drivable area data, intersection data.

8. The computing system of claim 3, wherein the traffic element is a red traffic light, a yellow traffic light, a green traffic light, an unknown traffic light, a stop sign, or a yield sign.

9. The computing system of claim 3, wherein the interaction type between the first node and the second node is (i) for the first object to ignore when the predicted trajectory of the first object and the predicted trajectory of the second object do not intersect, (ii) for the first object to go when the predicted trajectory of the first object and the predicted trajectory of the second object do intersect and the first object arrives at the traffic element before the second object, or (iii) for the first object to yield when the predicted trajectory of the first object and the predicted trajectory of the second object do intersect and the first object arrives at the traffic element after the second object.

10. The computing system of claim 1, wherein the operations further comprising implementing a motion plan for the second object based on the predicted trajectory of the first object.

11. The computing system of claim 1, wherein the first object and the second object comprise a first vehicle and a second vehicle.

12. The computing system of claim 11, wherein the first vehicle and the second vehicle are both moving vehicles, and parked vehicles are not included as nodes in the generated hybrid graph.

13. The computing system of claim 1, wherein the hybrid graph includes a directional edge from the first node and the second node, the directional edge having a relative position and velocity of the first object in relation to the second object.

14. The computing system of claim 1, wherein the hybrid graph includes past trajectory data of the first node associated with the past trajectory of the first object.

15. A computer-implemented method for controlling motion of an autonomous vehicle comprising:

obtaining object data associated with a first object and a second object, the object data having position data and velocity data for the first object and the second object;

processing, using a graph generator, the obtained object data to generate a hybrid graph, the hybrid graph having a first node indicative of the first object and a second node indicative of the second object;

processing, using an interaction prediction model, the generated hybrid graph to predict an interaction type for edges in the hybrid graph including an edge between the first node and the second node, wherein the interaction type is predicted from a predetermined set of discrete interaction types;

processing, using a graph neural network model, the predicted interaction type between the first node and the second node to predict a trajectory of the first object; and controlling motion of the autonomous vehicle based on a motion plan determined from the trajectory of the first object.

16. The computer-implemented method of claim 15, the method further comprising:

obtaining traffic element data associated with a traffic element, the traffic element data having map data of an area surrounding the traffic element;

processing, using the graph generator, the obtained traffic element data to generate the hybrid graph, the hybrid graph having a third node indicative of the traffic element; and processing, using the interaction prediction model, the generated hybrid graph to predict an interaction type between the first node and the third node; and processing, using the graph neural network model, the predicted interaction type between the first node and the third node to predict a trajectory of the first object.

17. The computer-implemented method of claim 16, the method further comprising:

processing, using the interaction prediction model, the generated hybrid graph to predict an interaction type between the first node and the third node when the first object is less than a predefined distance from the traffic element, and an interaction type between the second node and third node when the second object is less than the predefined distance from the traffic element;

determining a cross-entropy loss function based at least in part on the interaction type between the first node and the second node, the interaction type between the first node and third node, or the interaction type between the second node and third node; and modifying one or more of parameter values of the interaction prediction model based at least in part on the cross-entropy loss function.

18. The computer-implemented method of claim 16, the method further comprising:

processing, using the interaction prediction model, the generated hybrid graph to predict an interaction type between the first node and the third node, and an interaction type between the second node and the third node;

processing, using the graph neural network model, the interaction type between the first node and the second node, the interaction type between the first node and third node, or the interaction type between the second node and third node to predict a trajectory of the first node and a trajectory of the second node;

determining a Huber loss function based on the predicted trajectory of the first node and the predicted trajectory of the second node; and modifying one or more of parameter values of the graph neural network model based at least in part on the Huber loss function.

19. The computer-implemented method of claim 16, wherein the obtained traffic element data indicates that a traffic light state of the traffic element is an unknown traffic light, and wherein the method further comprises:

determining, using a light prediction model, that the traffic light state of the traffic element is either a green traffic light, a yellow traffic light, or a red traffic light;

updating, using the graph generator, the generated hybrid graph based on the determined traffic light state;

updating, using the interaction prediction model, the interaction type between the first object and the second object based on the updated hybrid graph; and updating, using the graph neural network model, the predicted trajectory of the first object based on the updated interaction type between the first object and the second object.

20. An autonomous vehicle comprising:

one or more processors; and one or more non-transitory computer-readable medium storing instructions for execution by the one or more processors to cause the one or more processors to perform operations, the operations comprising:

obtaining object data associated with a first object and a second object, the object data having position data and velocity data for the first object and the second object;

obtaining traffic element data associated with a traffic element, the traffic element data having map data of an area surrounding the traffic element;

processing the obtained object data and the obtained traffic element data to generate a hybrid graph, the hybrid graph having a first node indicative of the first object, a second node indicative of the second object, and a third node indicative of the traffic element;

processing, using a prediction model, the generated hybrid graph to predict an interaction type for edges in the hybrid graph including an edge between the first node and the second node and an edge between the first node and the third node, wherein the interaction type is predicted from a predetermined set of discrete interaction types;

processing, using the prediction model, the predicted interaction type between the first node and the second node, and the predicted interaction type between the first node and the third node to predict a trajectory of the first object; and controlling motion of the autonomous vehicle based on a motion plan determined from the trajectory of the first object.

* * * * *